United States Patent [19]
Fujiki et al.*

[11] Patent Number: 5,969,725
[45] Date of Patent: *Oct. 19, 1999

[54] UNIFICATION OF THREE-DIMENSIONAL IMAGE DATA HAVING PLURAL SURFACE SHAPES

[75] Inventors: Masakazu Fujiki, Yokohama; Hiroyuki Yamamoto, Chigasaki; Shinji Uchiyama, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/616,628

[22] Filed: Mar. 15, 1996

[30]  Foreign Application Priority Data

Mar. 17, 1995 [JP] Japan .................................. 7-058795
Apr. 20, 1995 [JP] Japan .................................. 7-094914
Nov. 14, 1995 [JP] Japan .................................. 7-295430

[51] Int. Cl.⁶ .................................................. G06T 17/00
[52] U.S. Cl. ........................................ 345/433; 345/435
[58] Field of Search .................................... 345/420, 427, 345/433, 435, 437, 438, 339, 342, 113, 121, 126, 964, 973, 974; 364/474.22, 474.24, 474.28, 474.34

[56]  References Cited

U.S. PATENT DOCUMENTS

| | | | |
|---|---|---|---|
| 4,775,946 | 10/1988 | Anjyo ....................................... | 345/419 |
| 4,845,651 | 7/1989 | Aizawa et al. ........................... | 345/425 |
| 5,072,413 | 12/1991 | Seki et al. ................................ | 345/427 |
| 5,303,337 | 4/1994 | Ishida ...................................... | 345/419 |
| 5,309,550 | 5/1994 | Takahashi ................................ | 345/421 |
| 5,371,778 | 12/1994 | Yanof et al. ............................... | 378/4 |
| 5,461,709 | 10/1995 | Brown ..................................... | 345/355 |
| 5,485,560 | 1/1996 | Ishida et al. ............................. | 345/433 |
| 5,553,009 | 9/1996 | Meshkat et al. ......................... | 364/578 |
| 5,561,748 | 10/1996 | Niu et al. ................................. | 345/420 |
| 5,601,084 | 2/1997 | Sheehan et al. ................... | 128/661.04 |
| 5,617,322 | 4/1997 | Yokota ............................... | 364/468.04 |
| 5,619,630 | 4/1997 | Minami et al. .......................... | 345/433 |
| 5,623,583 | 4/1997 | Nishino ................................... | 345/420 |
| 5,682,468 | 10/1997 | Fortenbery et al. ............................. | 1/1 |
| 5,748,865 | 5/1998 | Yamamoto et al. .................... | 345/428 |
| 5,798,764 | 8/1998 | Akiyama ................................. | 345/423 |

FOREIGN PATENT DOCUMENTS 2658935  8/1991  France .

OTHER PUBLICATIONS

Proceedings of the Annual International Conference of the IEEE Engineering in Medicine and Biology Society, vol. 13, Oct. 31, 1991 –Nov. 2, 1991, New York, NY US, pp. 39–40, XP000347734—LaValle E.A.: "Matching of Medical Images for Computed and Robot Assisted Surgery".

Philips Journal of Research, vol. 47, No. 2, 1992, Eindhoven NL, pp. 81–97, XP002014182, Moshfeghi and Rusinek: "Three Dimensional Registration of Multimodality Medical Images Using the Principal Axes Technique".

Foley et al, Second Edition, *Computer Graphics Principles and Practice*, Addison–Wesley Systems Publishing Company, pp. 231–236.

S. Iguchi, Optoelectronics (in Japanese) No. 48, Dec. 1985, with translation thereof.

A. Sugihara, Information Processing (in Japanese) vol. 30, No. 9, pp. 1067–1075, Sep. 1989, with translation thereof.

*Primary Examiner*—Stephen S. Hong
*Attorney, Agent, or Firm*—Fitzpatrick Cella Harper & Scinto

[57]  ABSTRACT

A method and an apparatus for providing easy alignment of two surface shapes of a three-dimensional object, obtained from different directions of line of sight. There are executed data entry of the two surface shapes, and initialization and storage of the direction of line of sight in the projected display of the surface shapes. The variables define the position and direction of the surface shape, and the position of a section plane for the surface shapes, to display projected images and section images. The setting of the position and direction of the surface shape and the position of the section plane is changed, thereby aligning the surface shapes, and, after the alignment, the amounts of translation and rotation of the surface shape is released.

27 Claims, 32 Drawing Sheets

APERTURE

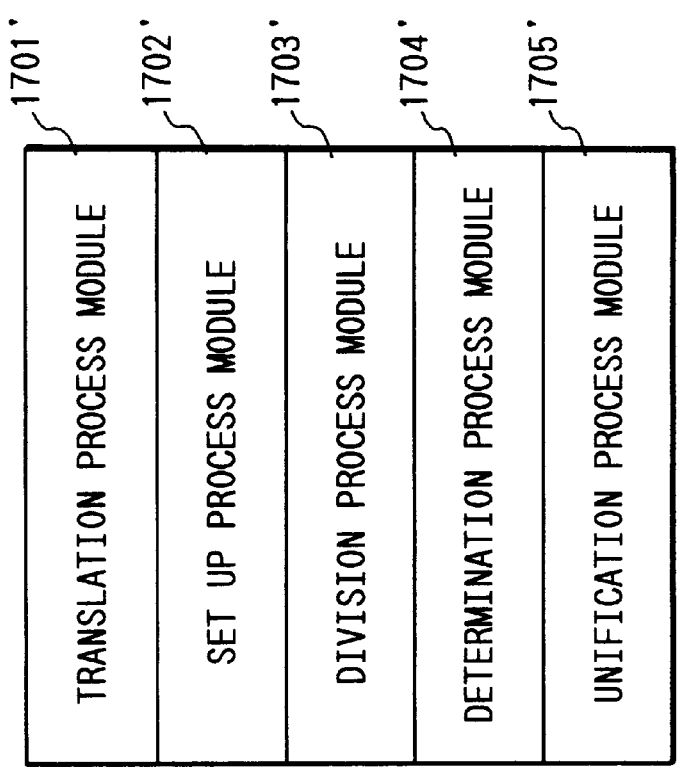
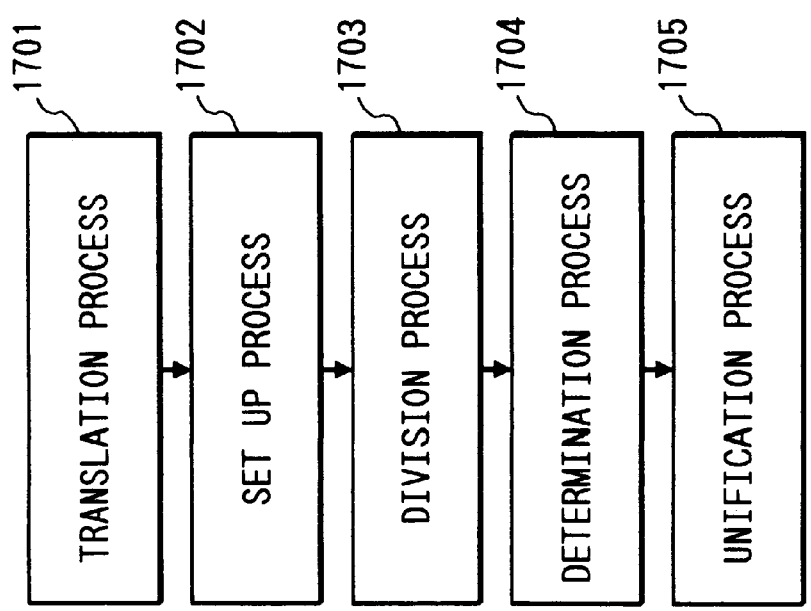

UNIFICATION OF THREE-DIMENSIONAL IMAGE DATA HAVING PLURAL SURFACE SHAPES

BACKGROUND OF THE INVENTION

1. Field of the Invention

The present invention relates to an alignment method for a three-dimensional (3D) object, for aligning plural surface shapes acquired by measuring the three-dimensional object from plural different directions, and an apparatus therefor.

The present invention also relates to a unifying method for three-dimensional shape data, for aligning plural surface shapes acquired as mentioned above, as shape data utilizing plural triangular patches, thereby unifying these data into single three-dimensional shape data, and an apparatus therefor.

The present invention also relates to an information processing apparatus capable, in the unifying process for the above-mentioned surface shapes, of unifying plural hierarchic geometrical shape data utilizing polygon patches, into a single hierarchic geometrical shape data, and a method therefor.

2. Related Background Art

There has been developed technology for entering the three-dimensional shape data of an object, utilizing for example an image input apparatus capable of entering a distanced image. The input of such distanced image has been achieved, for example, by:

(1) light wave distance measurement for measuring the light flight time by time measurement or phase measurement and determining the distance to the object from the time required by the light to reach the object and return therefrom; or (2) trigonometric distance measurement by taking a scene from different angles with plural cameras and determining the corresponding points in the images taken by the cameras; or (3) trigonometric measurement utilizing a camera and a projector for projecting a light pattern [S. Iguchi et al., Optoelectronics (1985), No. 12, pp.59]

The shape data of an object are generated from thus entered data of the distanced image, by preparing normal line vectors of plural resolutions, then preparing plural edge map data from the distanced image data and the normal line vectors thereby generating polygon data of plural sizes, and generating triangular patches by dividing the polygon data into triangles.

It is also proposed to prepare a three-dimensional geometrical model, based on thus entered distanced image data, by approximating the surface shape of the three-dimensional object with small planar patches (for example as disclosed in the U.S. patent application Ser. No.08/300,997).

It is in general possible to more precisely express the surface irregularities of the three-dimensional shape by employing a larger number of planar patches of smaller areas, but, in the computer processing of the three-dimensional data, the amount of processing can be reduced with a smaller number of patches. It is therefore generally practiced to prepare plural three-dimensional shape data, different in the precision of shape expression, and to suitably switch these shape data according to the processing ability of the computer or the operation status of the application. The level of such precision of the shape expression will be defined as a "hierarchy", and the shape data of plural hierarchic levels will be collectively called "hierarchic three-dimensional shape data". There is already proposed a method of preparing such hierarchic three-dimensional data (for example as disclosed in the U.S. patent application Ser. No.08/300,997).

Also for displaying such distanced image, there is known a method of displaying an image of the three-dimensional object, seen from an arbitrary direction of line of sight, and changing the direction of line of sight with a suitable device such as a mouse or a keyboard.

However, as the above-mentioned distanced image input apparatus utilizes two-dimensional (2D) optical scanning based on a rotating mirror or a fixed camera, the measurement of the rear side, upper face or bottom of the object is not possible. For acquiring the three-dimensional shape data of the object from all the directions, it is necessary to unify the surface shape data of the object measured from plural directions. Since the surface shapes acquired from different directions of measurement generally have respectively different three-dimensional coordinate systems, it becomes necessary, in unifying the plural surface shape data, to effect alignment for determining the positional relationship among the surface shapes.

For aligning the plural surface shapes of the three-dimensional object, there can be utilized the above-mentioned display method according to the direction of line of sight. More specifically the alignment is conducted by displaying an image, obtained by projecting the surface shapes onto a known plane in the three-dimensional space, and manually adjusting the position and the direction of one or plural surface shapes in the three-dimensional space, while watching the displayed image, so as that the same parts in the surface shapes mutually coincide. This method, however, is associated with a drawback of generating a positional aberration in a direction perpendicular to the projected plane, since, in this method, it is difficult to detect the displacement of the three-dimensional object in the above-mentioned direction on the projected image.

FIG. 8A shows a projected image obtained by aligning two surface shapes on a projecting plane, and FIG. 8B shows an image on a different projecting plane, of the two surface shapes maintained in the same positional relationship as in FIG. 8A. From FIGS. 8A and 8B it will be understood that a positional aberration is generated between the two surface shapes, in a direction perpendicular to the projecting plane of FIG. 8A.

In order to resolve the above-mentioned drawback, there is proposed a method of simultaneously displaying images of the three-dimensional object onto different plural projecting planes and manually aligning the three-dimensional object with the help of these projected images. In this method, however, the operator is required to adjust the position of the surface shapes while watching the positional aberrations between the two surface shapes on the plural displayed images, and such operation is not only difficult but also cumbersome and time-consuming, and is extremely burdensome for the operator.

On the other hand, the efficiency of generation of the three-dimensional shape data can be apparently improved if plural three-dimensional shape data can be unified to generate new three-dimensional shape data. However, for the hierarchic three-dimensional shape data mentioned above, there has not been known a method for unifying plural three-dimensional shape data.

Also in unifying the shape data having an aperture, the unified shape data may contain a void portion by the influence of the aperture unless the shape data to be unified are appropriately positioned. Particularly in the hierarchic three-dimensional shape data, the shape data of each hierarchic level may vary delicately, so that the influence of the aperture may happen or not depending on the hierarchic level.

SUMMARY OF THE INVENTION

In consideration of the foregoing, an object of the present invention is to provide an alignment method for a three-dimensional object enabling easy alignment of the plural surface shapes, and an apparatus therefor.

Another object of the present invention is to provide a unifying method for three-dimensional shape data, allowing to unify plural three-dimensional data, independently generated from the distanced image data entered from plural directions, thereby preparing complete geometrical data of an object, and an apparatus therefor.

Still another object of the present invention is to provide an information processing method allowing to unify plural hierarchic shape data, having plural different polygon patches and different in the precision of shape expression, thereby improving the function of the shape model utilized in CAD or virtual reality, and an apparatus therefor.

Still another object of the present invention is to enable automatic judgment, in unifying the shape data, whether a void portion is generated by the aperture.

Still another object of the present invention is to enable unification of the shape so as to prevent the formation of the void portion.

The above-mentioned objects can be attained, according to the present invention, by an alignment method for three-dimensional object, comprising a step of calculating the coordinates of a point, obtained by rotation and translation of a point in the three-dimensional space with respect to a known coordinate axis; a step of drawing, utilizing thus calculated coordinates of the above-mentioned point, the shape of the three-dimensional object projected onto a predetermined plane; and a step of drawing and displaying the cross section of the three-dimensional object, obtained by section with a section plane different from the above-mentioned plane.

Also according to the present invention there is provided an alignment apparatus for three-dimensional object, comprising calculation means for calculating the coordinates of a point, obtained by rotation and translation of a point in the three-dimensional space with respect to a known coordinate axis; drawing means for drawing, utilizing thus calculated coordinates of the above-mentioned point, the shape of the three-dimensional object projected onto a predetermined plane; and drawing means for drawing and displaying the cross-sectional shape of the above-mentioned three-dimensional object, obtained by section with a section plane different from the above-mentioned plane.

Also the above-mentioned objects can be attained, according to the present invention, by a three-dimensional shape data unifying apparatus comprising storage means for storing plural three-dimensional shape data representing an object; alignment means for mutual alignment of said plural three-dimensional shape data; section plane setting means for setting, for the plural three-dimensional shape data subjected to the alignment by said alignment means, a section plane in the vicinity of boundary of the above-mentioned plural three-dimensional shape data; shape division means for determining partial shape data separated by the above-mentioned section plane; and unification means for representing, for each section plane, the data of areas of the partial shape data on both sides of the section plane by a two-dimensional coordinate system and generating triangular patch data in the above-mentioned areas by Delaunay triangular mesh (triangulation net, thereby unifying the above-mentioned plural three-dimensional shape data.

Also according to the present invention there is provided a method for unifying the three-dimensional shape data, comprising a step of storing plural three-dimensional shape data representing an object; a step of effecting mutual alignment of the above-mentioned plural three-dimensional shape data; a step of setting, for the plural three-dimensional shape data subjected to the above-mentioned alignment, a section plane in the vicinity of the boundary of the above-mentioned plural three-dimensional shape data; a step of determining partial shape data separated by the above-mentioned section plane; and a step of representing, for each section plane, the data of areas of the partial shape data on both sides of the section plane by a two-dimensional coordinate system and generating triangular patch data in the above-mentioned areas with a Delaunay triangular mesh.

Also the above-mentioned objects can be attained, according to the present invention, by an information processing apparatus for processing plural hierarchic three-dimensional shape data comprising:

translation means for translating the shape data of respective hierarchic levels of said plural hierarchic three-dimensional shape data to a positional relationship for unification;

setting means for selecting two shape data from the shape data after translation by said translation means and setting a section plane constituting the boundary plane after the unification of the two;

division means for dividing each of the two shape data by the section plane and forming gap areas on both sides of the section plane, in portions to be used for unifying thus divided shape data;

unification means for generating polygon patches in the gap areas thereby unifying the two shape data;

first control means for causing the unification means to effect unification of the shape data on all the plural hierarchic three-dimensional shape data; and second control means for causing the first control means to effect unification on all the hierarchic levels of the plural hierarchic three-dimensional shape data, utilizing the results of translation by the translation means and the section planes.

Also the above-mentioned objects can be attained, according to the present invention, by another information processing apparatus for processing plural three-dimensional shape data, comprising:

translation means for translating the three-dimensional shape data to be unified into a positional relationship in a unified state;

setting means for setting, for two shape data after translation by said translation means, a section plane constituting the boundary plane of the unification of the two:

division means for dividing each of the two shape data by the section plane and forming gap areas on both sides of the section plane, between the partial shapes to be used for unifying thus divided shape data;

judgment means for judging whether the section plane crosses an aperture in at least either of the above-mentioned two shape data;

unification means adapted, in case the section plane does not cross the aperture of the two shape data, to generate polygon patches in the gap areas, thereby unifying the two shape data; and first control means for causing the unification means to effect unification of the shape data on all the plural hierarchic three-dimensional shape data to be unified.

Also according to the present invention there is provided still another information processing apparatus for processing plural three-dimensional shape data, comprising:

translation means for translating the three-dimensional shape data to be unified to a positional relationship in unified state;

setting means for setting, for two shape data after translation by the translation means, a section plane constituting a boundary plane for the unification of the two;

division means for dividing each of the two shape data by the section plane, and forming gap areas on both sides of the section plane between the partial shapes to be used for unification of thus divided shape data;

extraction means for extracting vertexes constituting the gap areas in the partial shapes to be used for unification of the shape data and vertexes contained in the partial shapes, among those of the aperture contained in the shape data;

unification means for generating, utilizing the vertexes extracted by the extraction means, polygon patches in the gap areas, thereby unifying the two shape data.

BRIEF DESCRIPTION OF THE DRAWINGS

FIGS. 33A and 33B are views showing the structural feature of another program of the present invention;

DETAILED DESCRIPTION OF THE PREFERRED EMBODIMENTS (a) 1st Embodiment

Now the present invention will be clarified by preferred embodiments thereof, with reference to the attached drawings.

Figure 1:
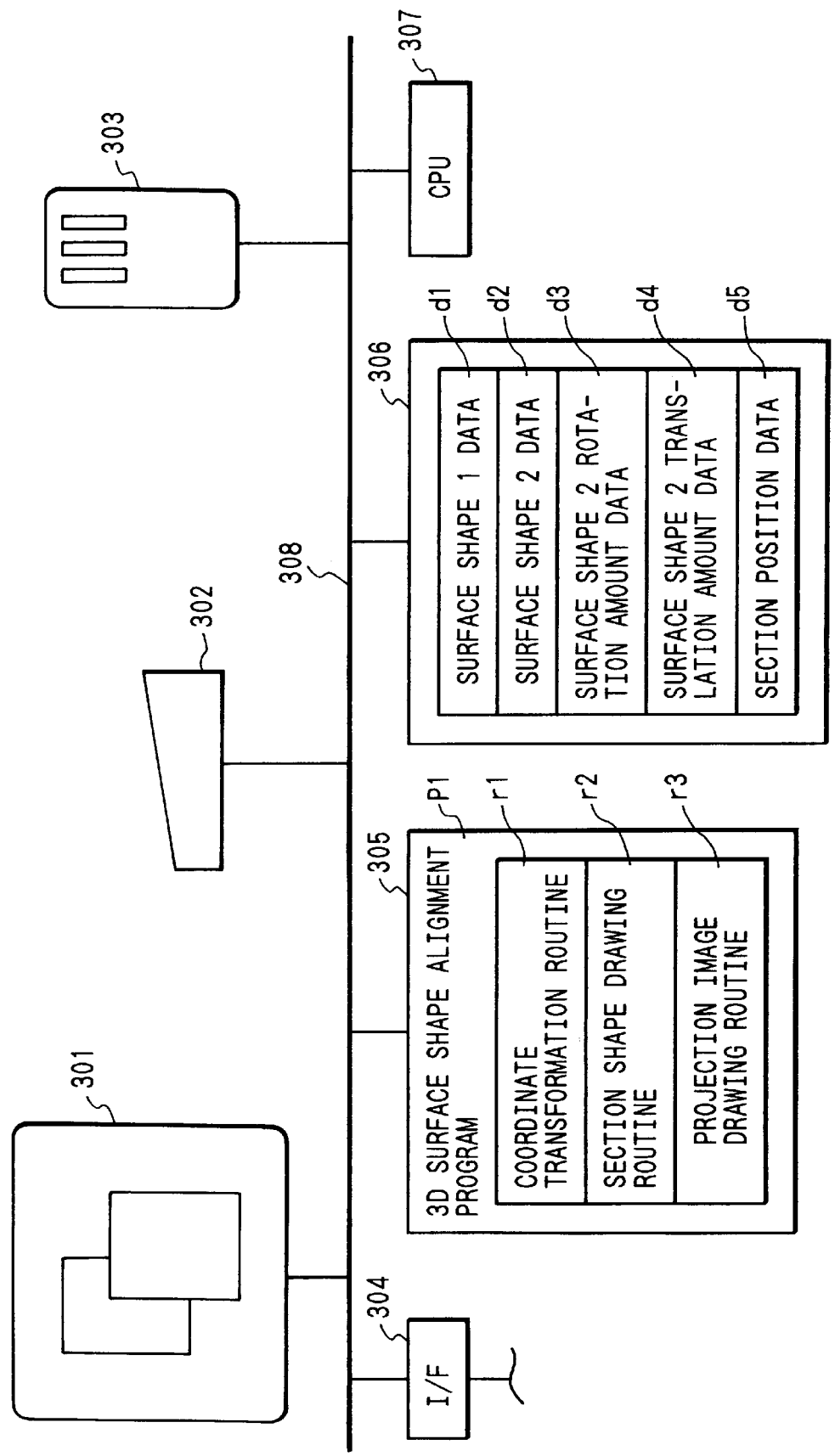
FIG. 1 is a block diagram of an alignment apparatus for a three-dimensional object, constituting a 1st embodiment of the present invention.
Figure 2:
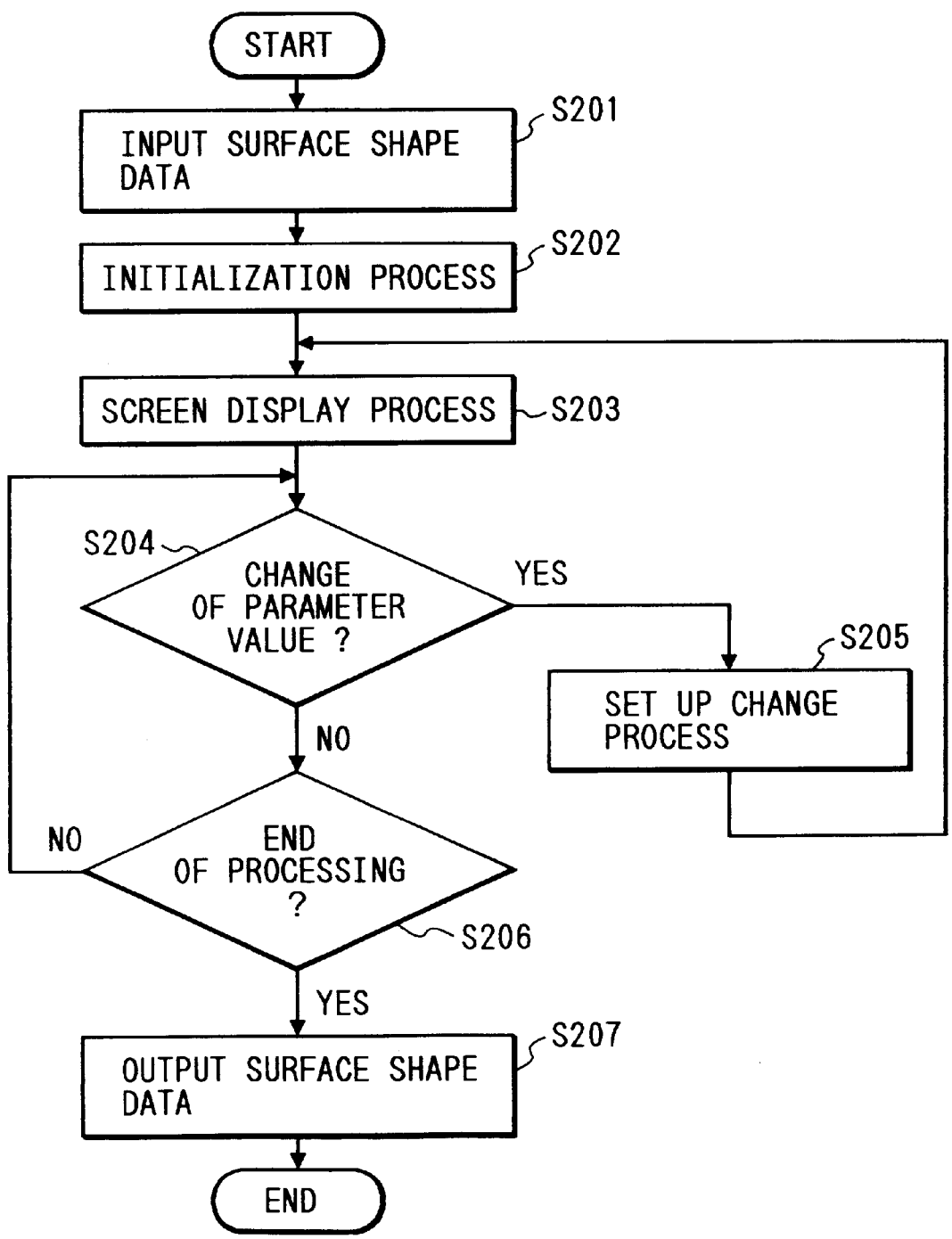
FIG. 2 is a flow chart of an alignment method for a three-dimensional object according to the 1st embodiment.

FIG. 1 is a block diagram of a three-dimensional object aligning apparatus according to a 1st embodiment of the present invention, and FIG. 2 is a flow chart of a three-dimensional object aligning method utilizing the above-mentioned apparatus.

In FIG. 1 there are shown a display device 301; a keyboard 302; a mouse 303; an input/output unit 304 for external devices; a 1st memory device 305 storing routines r1–r3 as a three-dimensional surface shape aligning program for effecting a method shown in the flow chart in FIG. 2; a 2nd memory device 306 storing data d1–d5; a CPU 307 effecting the entire apparatus and executing the programs stored in the 1st memory device 305; and a bus 308 connecting various units.

The routines r1–r3 and the data d1–d5 mentioned above have the following contents:

p1: a program for aligning three-dimensional surface shape;

r1: a routine for determining coordinates on a surface shape 2 after rotation and translation under the program p1;

r2: a routine for drawing the section shapes of surface shapes 1 and 2 under the program p1;

r3: a routine for drawing the projected images of the surface shapes 1 and 2 under the program p1;

d1: coordinate data of each point on the surface shape 1 entered for processing;

d2: coordinate data of each point on the surface shape 2 entered for processing;

d3: data on the rotation amount designated for processing of the surface shape 2;

d4: data on the translation amount designated for processing of the surface shape 2; and d5: position data of the section plane designated for processing.

Figure 3A:
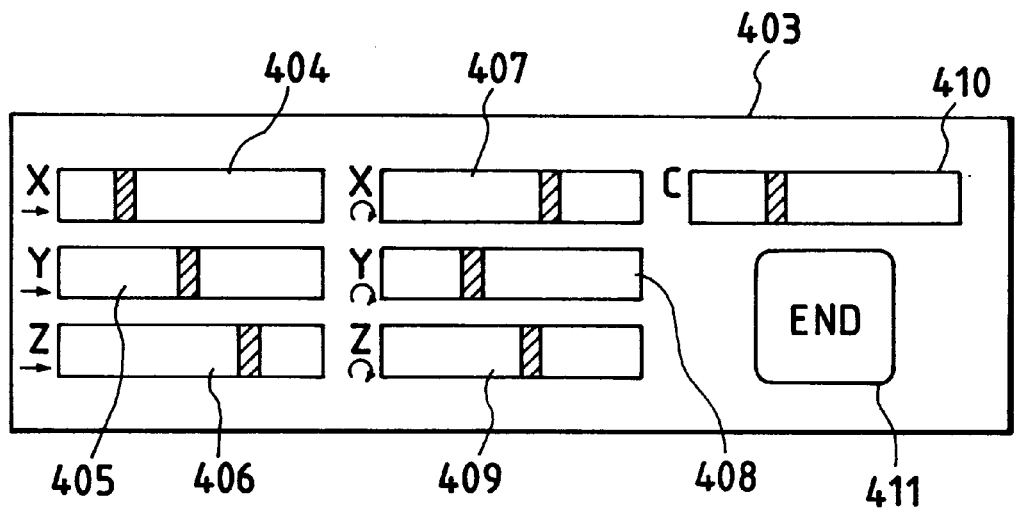
FIGS. 3A to 3C are schematic views showing examples of display on a display device.
Figure 3B:
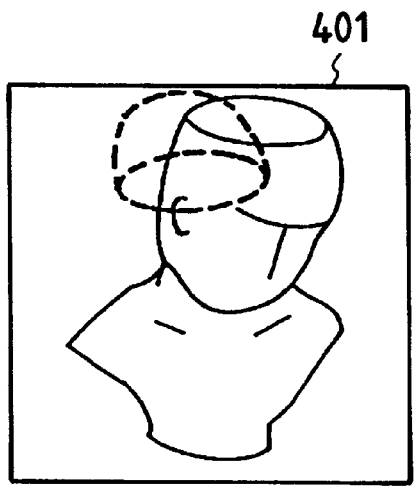
Figure 3C:
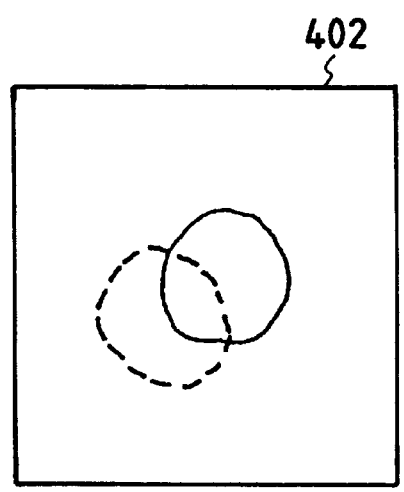

FIGS. 3A to 3C show examples of display on the display device 301.

The display frame consists of a display window 401 for a projected image of the surface shape of the three-dimensional object, a display window 402 for a cross sectional shape, and a control panel 403.

On the control panel 403, there are displayed variators 404–410 for setting the amounts of translation and rotation, the position of the section plane etc., with respect to the coordinate axes to be explained later, and an end button 411.

Figure 4:
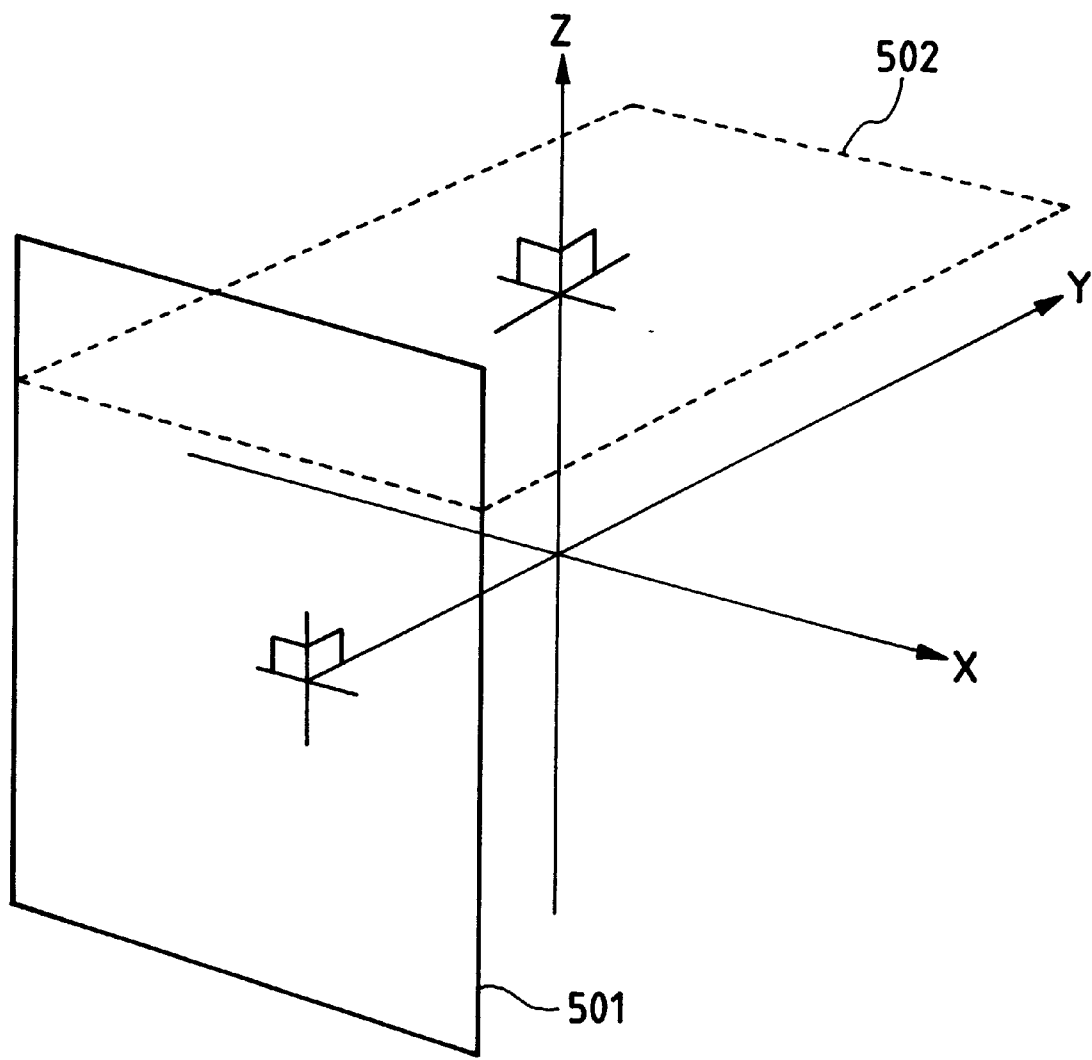
FIG. 4 is a view showing the positional relationship among a coordinate system, a projection plane and a section plane in the 1st embodiment.

FIG. 4 illustrates the positional relationship of the coordinate system, the projecting plane 501 and the section plane 502 in the present embodiment. The section plane 502 is perpendicular to the Z-axis in the coordinate system of the surface shape, and the position of the section plane 502 will be hereinafter defined by the z-coordinate of the crossing point of the section plane and the Z-axis. In the present embodiment, the alignment of two surface shapes (surface shapes 1 and 2) of a three-dimensional object, measured from two directions of line of sight (observing directions 1 and 2) with a distance measuring apparatus, is achieved by rotating and translating only one surface shape (surface shape 2 in case of the present embodiment). The surface shape data consist of coordinate values of a group of scattered points on the surface of the three-dimensional object subjected to the measurement.

In the following there will be explained the flow of the process by the CPU 307, with reference to FIG. 2.

At first a step S201 enters the data of the surface shapes 1 and 2 from the input/output unit 304. Then a step S202 effects initialization, which sets the direction of line of sight in the projected display of the surface shape, six variables defining the position and direction of the surface shape 2 and the position of the section plane, at predetermined values. At the same time, these set values are stored in d3, d4, d5 in the 2nd memory device 306 in FIG. 1. A step S203 displays the projected image, the surface shape image and the control panel 403 on the display device 301. This step S203 will be explained later in more details with reference to FIG. 5.

Then a step S204 discriminates whether changes have been made in the setting of the direction of line of sight, the position and direction of the surface shape 2 and the setting in the position of the section plane. More specifically, there is discriminated whether the position of line of sight has been varied by the mouse 303 and whether the positions of the variators 404–410 on the control panel 403 have been varied. In case a change is identified, a step S205 renews the set values and the sequence returns to the step S203.

On the other hand, if the step S204 identifies absence of change in the setting, a step S206 discriminates whether the alignment process is to be terminated by the depression of the end button 411. If the termination is identified, a step S207 releases the amounts of translation and rotation of the surface shape 2 from the input/output unit 304 and the process is terminated. If the termination is not identified, the sequence returns to the step S204.

Figure 5:
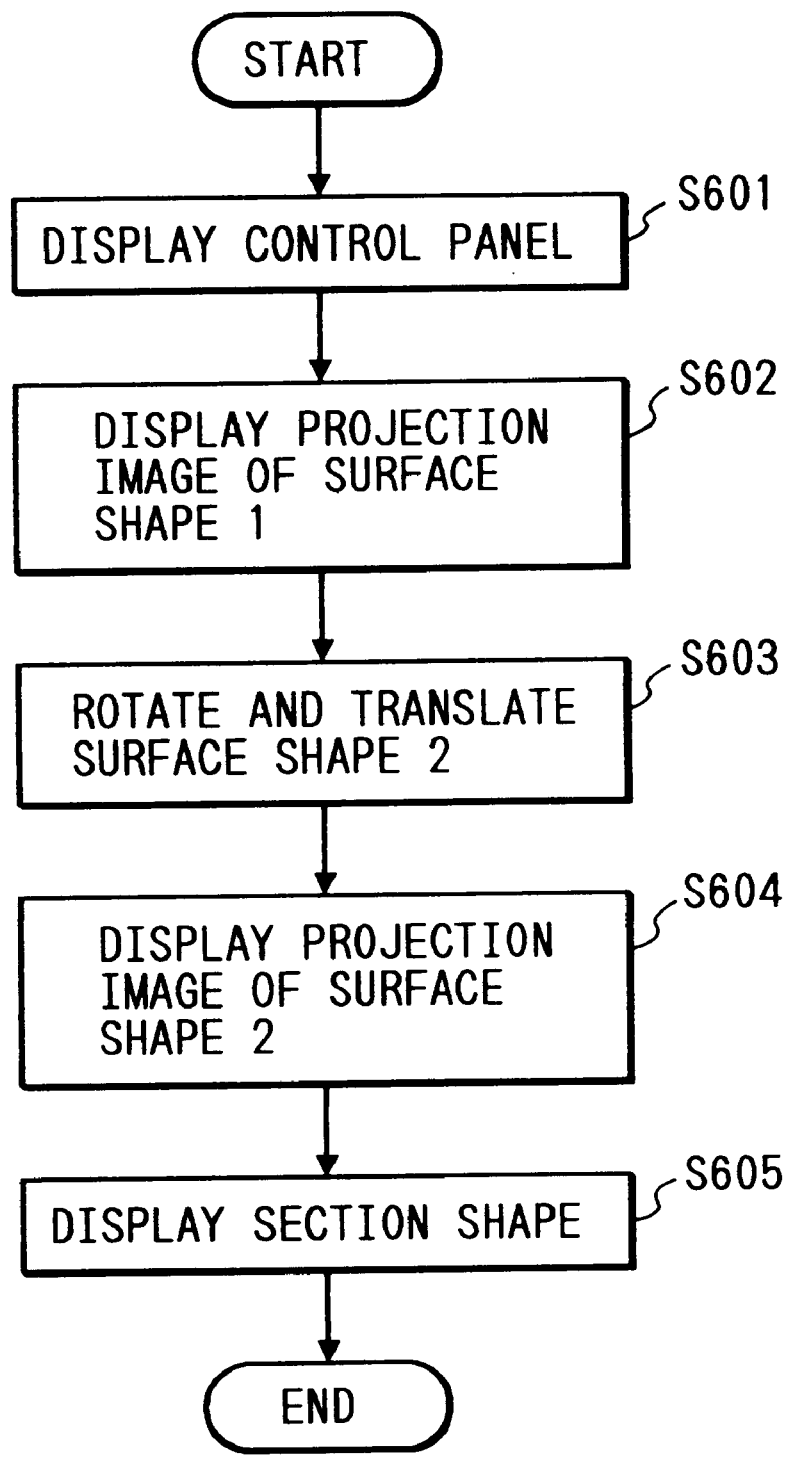
FIG. 5 is a flow chart of an image display process in a step S203 in FIG. 2.

In the following the step S203 in FIG. 2 will be explained further with reference to FIG. 5. At first a step S601 displays the control panel 403 as shown in FIG. 3A, wherein the knob positions of the variators 404, 405, 406, 407, 408, 409 and 410 are respectively determined by the set values, with respect to the XYZ coordinate system of the surface shape 2, of the amounts of translation in the X, Y and Z directions, the amounts of rotation about the X, Y and Z directions, and the position of the section plane.

The knob of each variator on the control panel 403 can be moved by pointing the knob with the mouse 303 and dragging the mouse 303 while the left button thereof is depressed. The represented value increases with the rightward movement of the knob.

A next step S602 displays, on the projected image display window 401, a projected image of the surface shape 1, seen from the set direction of line of sight. A next step S603 effects translation and rotation of the surface shape 2, by calculating, for each sample point $(x_2, y_2, z_2)$ of the surface shape, the coordinate $(x_2', y_2', z_2')$ after the translation and the rotation according to an equation (1):

$$\begin{pmatrix} X_2' \\ Y_2' \\ Z_2' \\ 1 \end{pmatrix} = T_z(t_z)T_y(t_y)T_x(t_x)R_z(\kappa)R_y(\phi)R_x(\omega) \begin{pmatrix} x_2 \\ y_2 \\ z_2 \\ 1 \end{pmatrix} \quad (1)$$

wherein $\omega$, $\phi$, $\kappa$ are the amounts of rotation in the X, Y, Z directions and $t_x$, $t_y$, $t_z$ are the amounts of translation in the X, Y, Z directions, set in the step S202 or S205.

In this equation $R_x$, $R_y$, $R_z$ are 4×4 matrixes respectively representing the rotations around X, Y, Z axes, and $T_x$, $T_y$, $T_z$ are 4×4 matrixes representing the translations in the X, Y, Z directions. Then a step S604 displayes, on the projected image display window 401, a projected image of the surface shape 2 seen from the set direction of line of sight, according to the coordinate values calculated in the step S603. A step S605 displayes, on the section shape display window 402, section shapes of the surface shapes 1, 2 (hereinafter called section shapes 1, 2), obtained by sectioning the surface shapes 1, 2 with a common section plane. In the display of the section shape, the direction of line of sight is fixed at a direction along the Z-axis from positive to negative side, and only the points whose z-coordinate satisfies the following equation (2):

$$d-\delta < z \leq d+\delta \quad (2)$$

are projected in the direction of the Z-axis to obtain the section shape on the display window 402, wherein $\delta$ is ½ of the sampling space in the Z-axis direction.

In the three-dimensional object aligning apparatus of the present embodiment, the display of the projected image is referred to in the translation in the Z-direction or in the rotation about the X or Y axis, and the display of the section shape is referred to in the rotation about the Z-axis or in the translation in the X or Y direction.

Figure 6A:
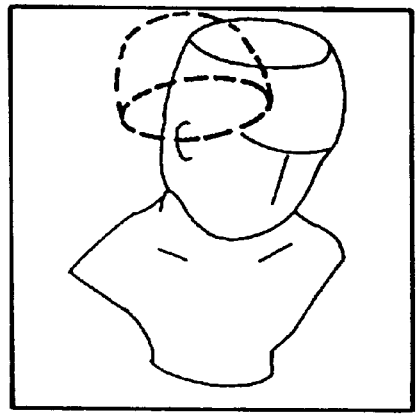
FIGS. 6A to 6D are views showing examples of display of the result of the 1st embodiment.
Figure 6B:
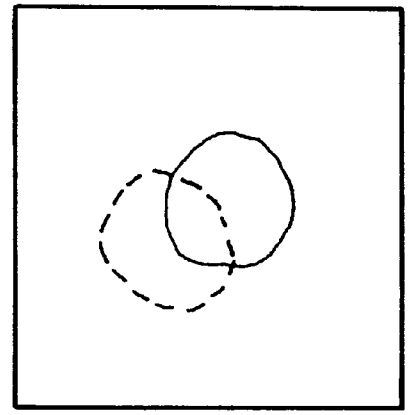
Figure 6C:
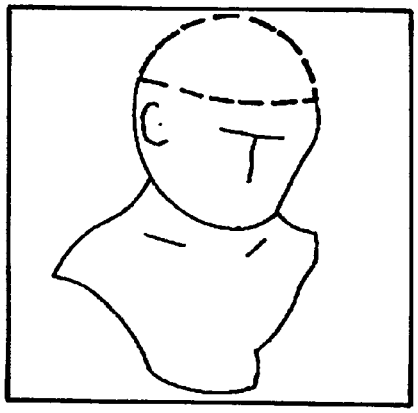
Figure 6D:
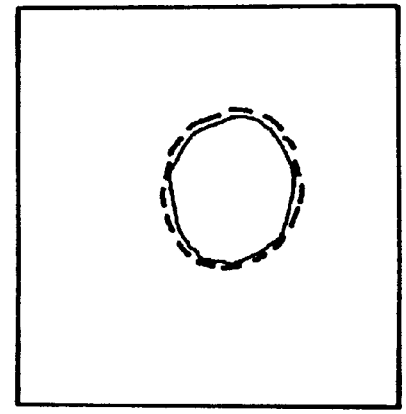

FIGS. 6A to 6D show examples of the result of application of the present embodiment. FIGS. 6A and 6B respectively show the projected image and the section shape image prior to the alignment, while FIGS. 6C and 6D are those after the alignment.

(b) 2nd Embodiment

Figure 7:
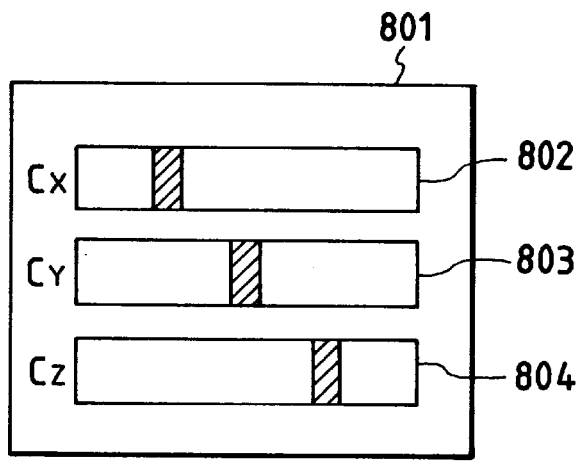
FIG. 7 is a view showing a section plane rotating control panel in a 2nd embodiment.
Figure 8A:
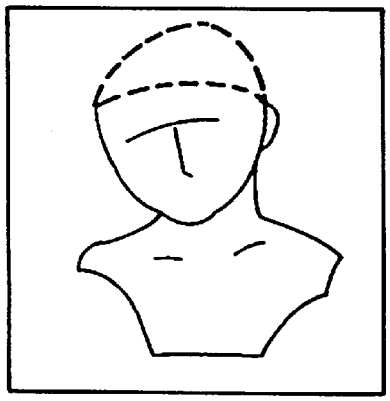
FIGS. 8A and 8B are views showing examples of display in a conventional three-dimensional alignment method.
Figure 8B:
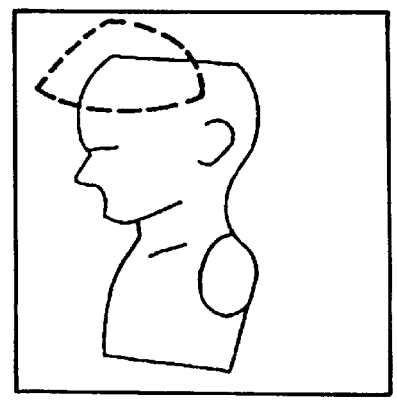

In the following there will be explained a 2nd embodiment, which allows to set the inclination of the section plane, in contrast to the 1st embodiment in which the section plane is perpendicular to the Z-axis. The present embodiment is provided with a 2nd control panel 801 as shown in FIG. 7, in addition to the control panel 403 as in the 1st embodiment. On the control panel 801 there are provided variators 802, 803, 804 for setting cosines ($c_x$, $c_y$, $c_z$) on the direction of normal line to the section plane.

The section plane can be represented by an equation (3):

$$c_x x + c_y y + c_z z = c_z f \quad (3)$$

wherein f is the z-coordinate of the crossing point between the section plane set by the variator 410 and the Z-axis.

In this state, the coordinate values ($x_c$, $y_c$, $z_c$) of the group of points contained in the section shape satisfy the following condition:

$$c_z f - \delta < c_x x_c + c_y y_c + c_z z \leq c_z f + \delta \quad (4)$$

In the display of the section shape, the coordinate values ($x_c$, $Y_c$, $z_c$) are converted into ($x_c'$, $y_c'$, $z_c'$) according to an equation (5) and the projection is made in the direction of Z-axis as in the 1st embodiment:

$$\begin{pmatrix} x_c' \\ y_c' \\ z_c' \end{pmatrix} = R_y(\beta) R_x(\alpha) \begin{pmatrix} x_c \\ y_c \\ z_c \end{pmatrix} \quad (5)$$

wherein $R_x(\alpha)$ is the rotational conversion of the rotation angle $\alpha$ about the X-axis, $R_y(\beta)$ is the rotational conversion of the rotational angle $\beta$ about the Y-axis, and:

$$d = \sqrt{c_y^2 + c_z^2} \quad (6)$$

$$\cos \alpha = c_z/d \quad (7)$$

$$\sin \alpha = c_y/d \quad (8)$$

$$\cos \beta = d \quad (9)$$

$$\sin \beta = c_x \quad (10)$$

(c) 3rd Embodiment

In the following there will be explained a 3rd embodiment.

The methods of the 1st and 2nd embodiments are applicable, not only to the alignment of the surface shapes represented by the point groups on the object surface, but also to the alignment of three-dimensional shape model such as a triangular patch model.

As explained in the foregoing, the 1st to 3rd embodiments enable easy confirmation, on the displayed image, of the aberration in a direction perpendicular to the projection plane, by displaying an image obtained by projecting the three-dimensional object in the direction of a coordinate axis and simultaneously projecting section shapes obtained by sectioning the two three-dimensional shapes with a section plane perpendicular to another coordinate axis.

It is also rendered possible to adjust, among six parameters defining the position and direction of the three-dimensional shape to be adjusted for alignment, three parameters for each image in succession, by displaying an image obtained by projecting the three-dimensional object in the direction of a coordinate axis and simultaneously displaying an image of the section shapes obtained by sectioning the two three-dimensional shapes by a section plane perpendicular to another coordinate axis.

(d) 4th Embodiment

In the following there will be explained a 4th embodiment of the present invention with reference to the attached drawings. At first there will be explained, with reference to FIG. 9, the outline of the three-dimensional shape data unifying method of the present embodiment.

Figure 9:
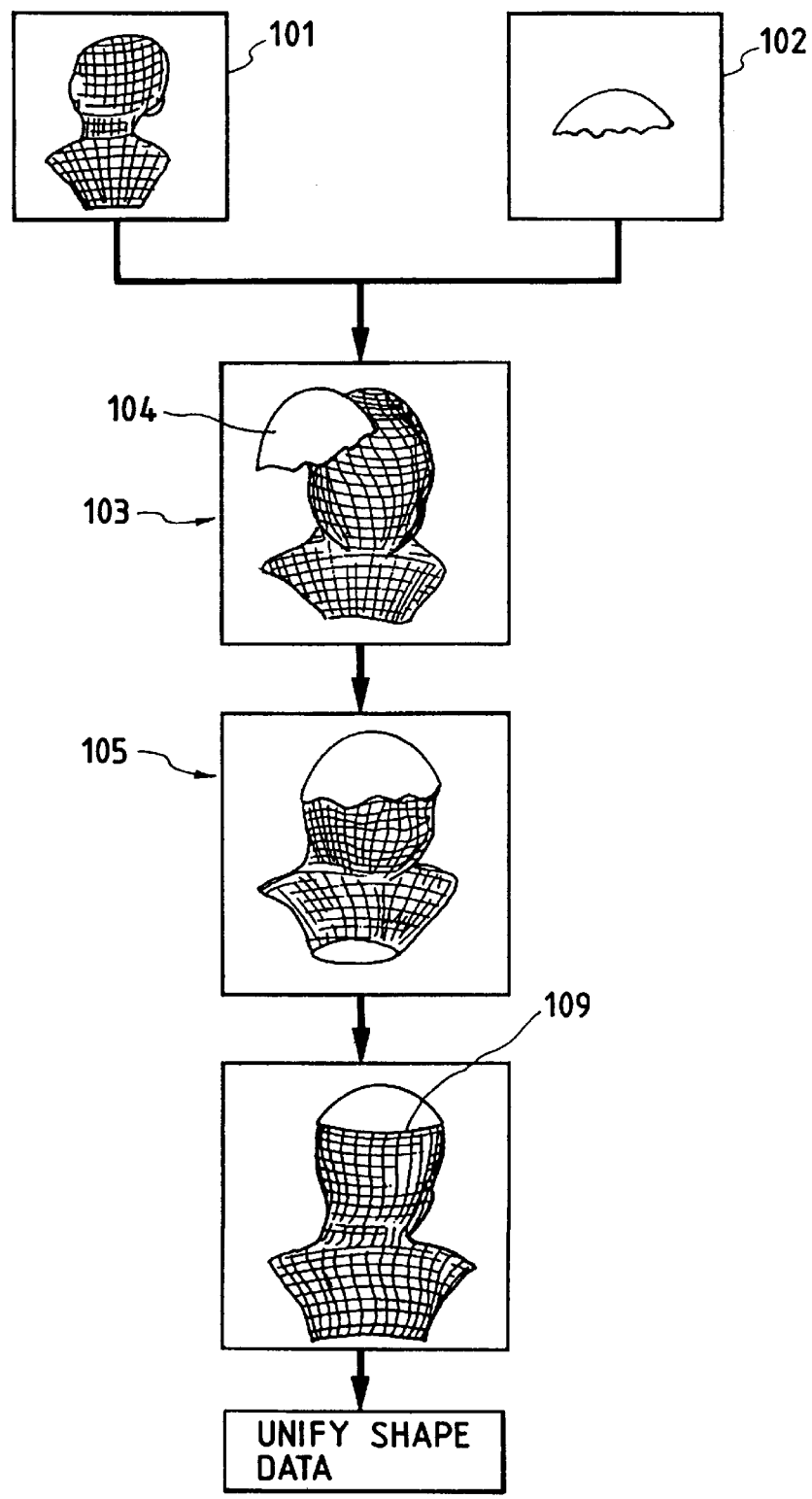
FIG. 9 is a schematic view showing steps of unifying the three-dimensional shape data in a 4th embodiment.

The three-dimensional shape data unifying apparatus of the present embodiment receive triangular polygon data 101, 102 generated from distanced image data and representing the shape of the object. A single set of shape data may merely represent the object seen only from a direction or only a part of the object. For example the shape data, generated from a distanced image obtained by observing the object from above, do not represent the shape of the lateral or bottom faces or the object. It is therefore necessary to enter plural three-dimensional polygon data representing the object from different directions. In FIG. 9, 103 indicates stored shape data, while 104 indicates data obtained by rotating the shape data 102.

In entering such plural shape data, each of the shape data 101, 102 has to be composed of an independent coordinate system. In such case, the positional relationship among the individual coordinate systems is adjusted (with parallel translation and rotation if necessary) and the alignment is executed in such a manner that all the shape data can be represented in a global coordinate system (105 in FIG. 9). In the present embodiment, this process is executed by interactive operations of the operator.

Then, there are selected two shape data having a mutually common portion, and a section plane (109 in FIG. 9) is set in the overlapping portions of these two shape data. The above-mentioned two shape data are unified, with this section plane as the boundary, in a subsequent process. This section plane is always set in the overlapping portion of the two shape data. In the present embodiment, this process is executed by interactive operations of the operator.

Furthermore, each shape data are divided into two portions by the above-mentioned section plane, and one of the above-mentioned portions is selected. In this selection, there is selected partial shape data having a higher precision and containing more data. In this manner a partial shape data is selected from each of the two shape data.

Then these two partial shape data are unified. For this purpose, within a partial shape data, the data of points adjacent to the section plane are converted into the coordinate system (three-dimensional) of the other partial shape data. Then these data are projected, together with the data of the point adjacent to the section plane in the latter partial shape data, onto a suitable image coordinate system (two dimensional). Then a Delaunay triangular mesh is generated, utilizing the point data projected onto the above-mentioned coordinate system. The triangular mesh thus generated is connected among the points present adjacent to the section plane, and triangular patches are generated in areas, lacking the triangular patches, on both sides of the section plane. Thus the original two shape data are unified by the individual partial shape data and the generated triangular patches. Finally thus unified shape data of the object are released for utilization in other applications.

In the following there will be given a detailed explanation on the three-dimensional shape unifying apparatus of the present embodiment.

Figure 10:
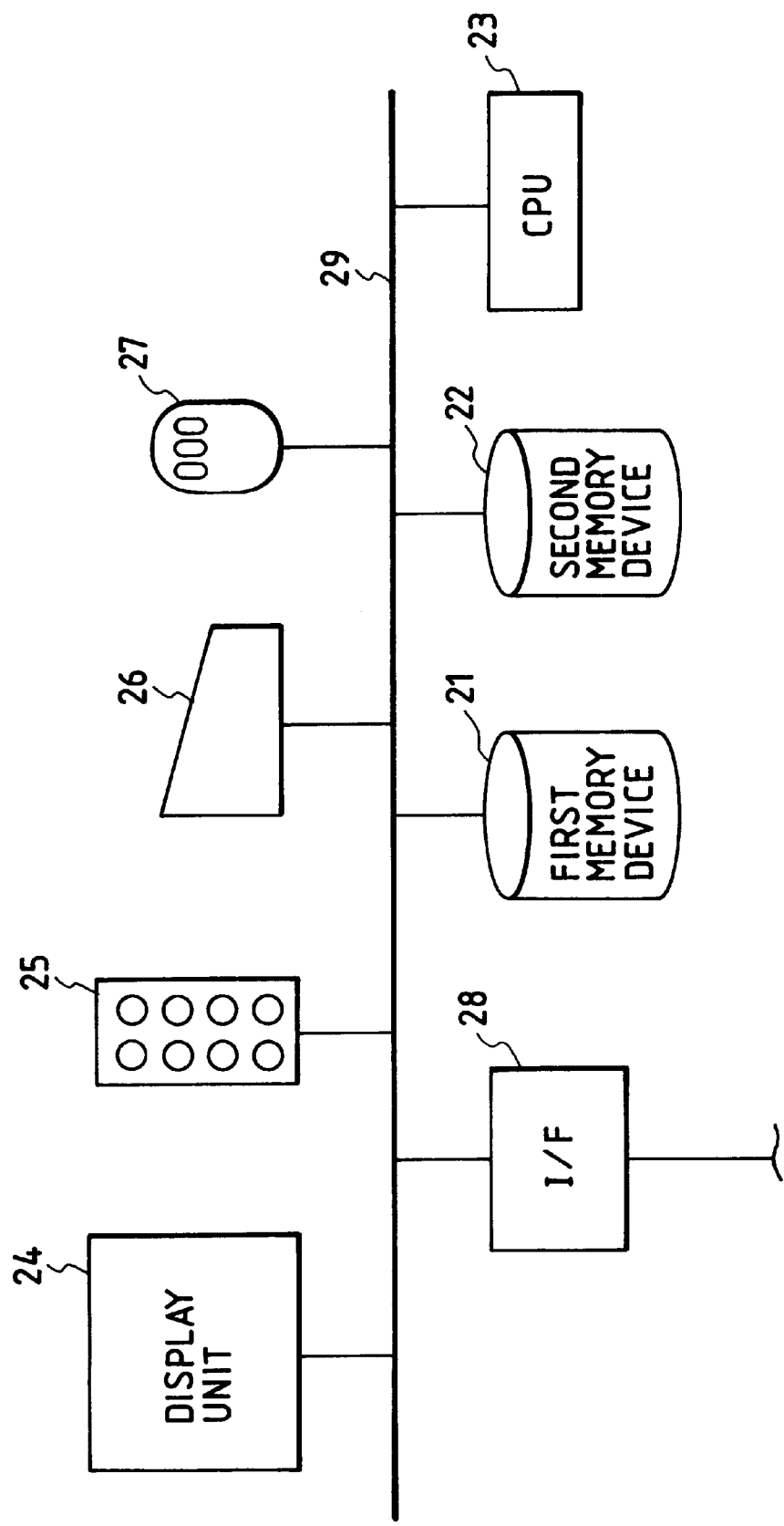
FIG. 10 is a schematic block diagram of a three-dimensional shape data unifying apparatus of the 4th embodiment.

FIG. 10 is a block diagram of the basic configuration of the above-mentioned apparatus.

Figure 12:
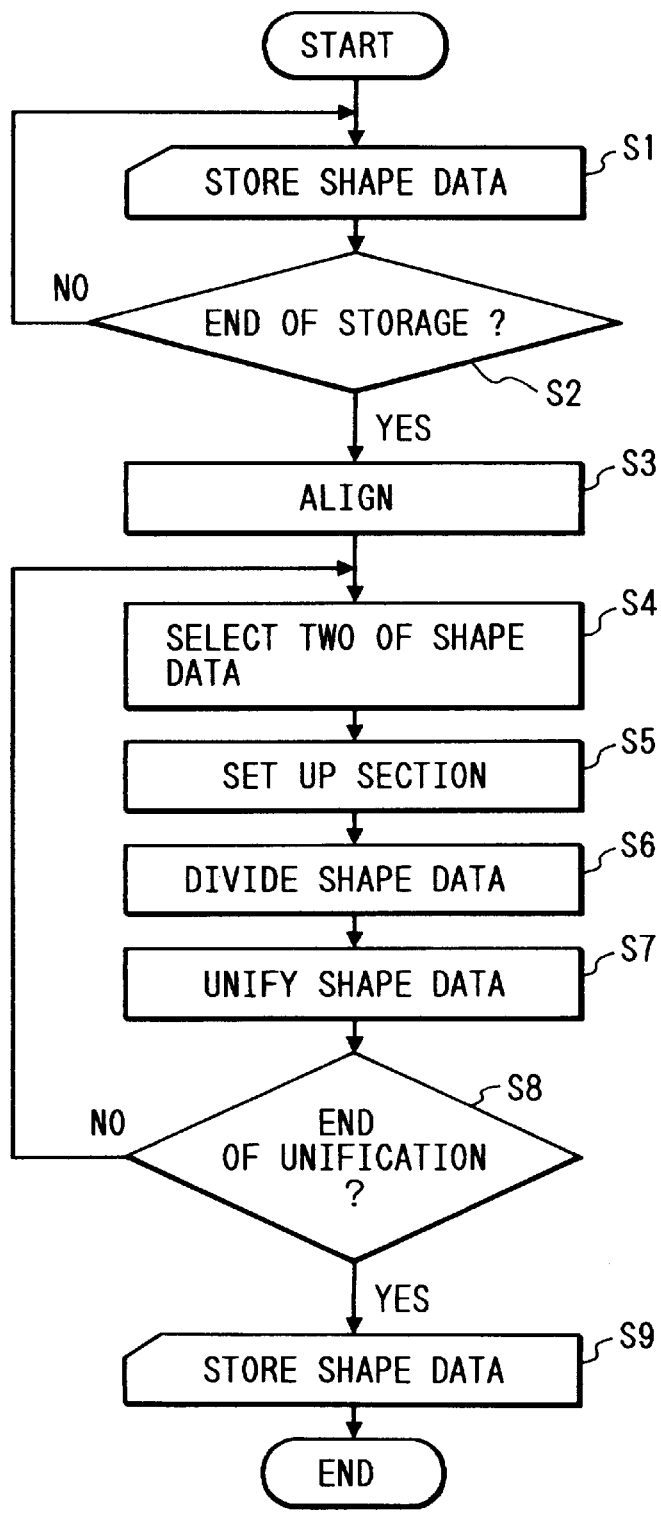
FIG. 12 is a flow chart of the three-dimensional shape data unification of the 4th embodiment.

In FIG. 10, there are shown a 1st memory device 21 for storing a program corresponding to a process as shown in FIG. 12, to be executed by a CPU 23 and other data; a 2nd memory device 22 for storing information necessary for the process and input/output data; a CPU 23 effecting various controls according to a control program stored in the 1st memory device 21; a display unit 24 such as a liquid crystal device or a cathode ray tube, for displaying information required for the process and three-dimensional shape data; variators 25 to be used by the operator for instructing parallel translation and rotation of the shape data; a keyboard 26 to be used by the operator for entering various data and instructions; a pointing device 27 such as a mouse, for instructing the movement of a mouse cursor on the display image of the display unit 24 or designating various commands or menu; an interface 28 for data exchange with unrepresented external equipment; and a bus 29 connecting various units mentioned above.

Figure 11:
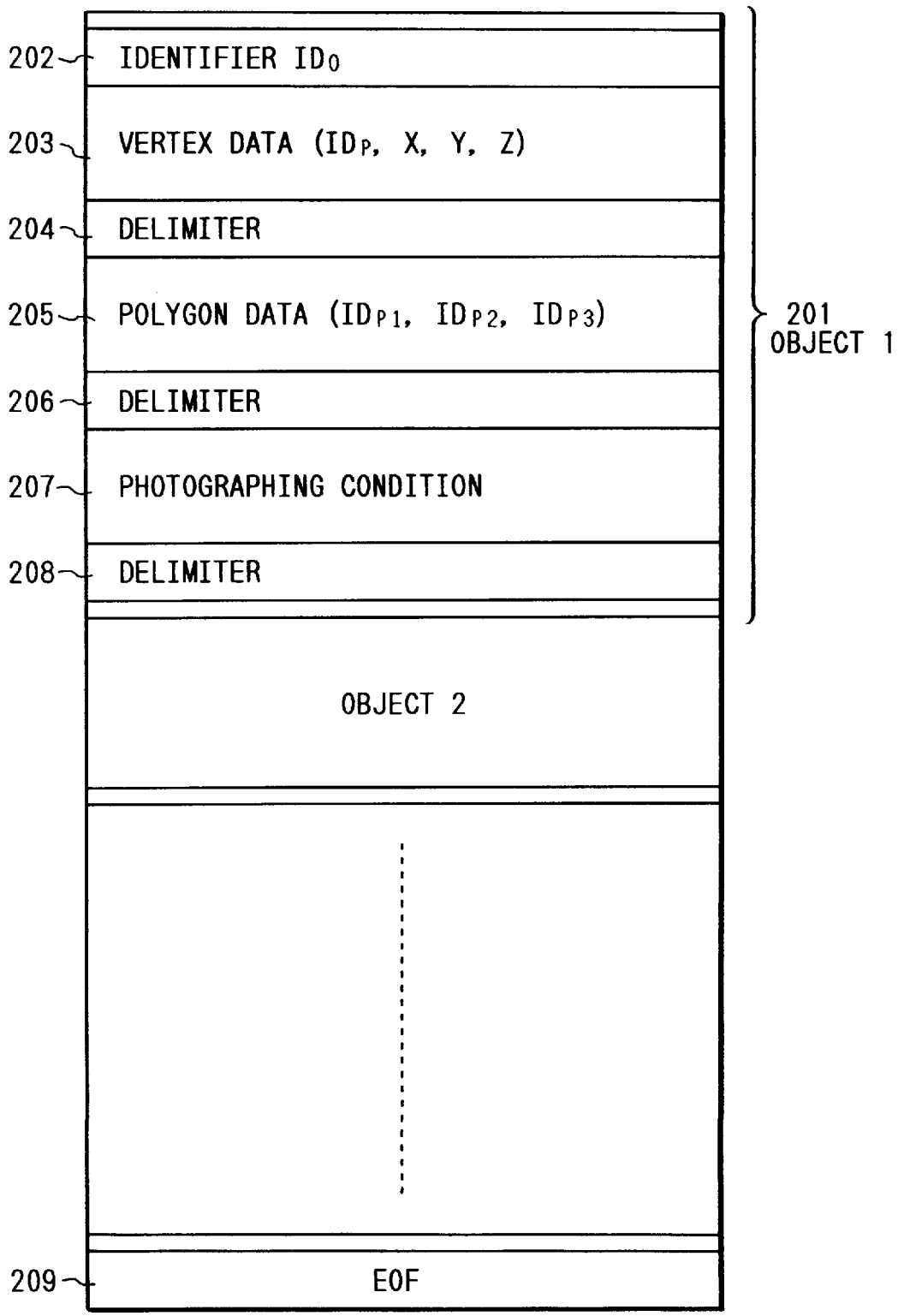
FIG. 11 is a view showing the data format of the shape data of the triangle polygon data to be processed in the 4th embodiment.

FIG. 11 shows the data format of a shape data file, or triangular polygon data, stored in the 2nd memory device 22 of the three-dimensional shape data unifying apparatus of the present embodiment.

In FIG. 11, shape data 201 represent the shape of the object 1, and include an identifier 202 (IDO), vertex data 203 (IDp, X, Y, Z) and information 205 on connection of the vertexes. A photographic condition 207 indicates the photographing conditions of the distanced image, used for generating the shape data, or, in case of a shape data unified from plural shape data, the information of the original shape data. A delimiter 208 represents the partition of the information of each object. This delimiter 208 can be used for storing polygon data of plural objects.

The vertex data 203 consist of three-dimensional coordinates (X, Y, Z), with an identifier IDp, of the vertexes of all the triangular patches contained in the shape data of the object. A delimiter 204 indicates the partition between the vertex data 203 and the connection information 205. The connection information 205, representing the connection of the polygon data, represents a triangle by a set of identifiers of three vertexes. A delimiter 206 represents the partition between the connection information 205 and the photographing condition 207. A delimiter 208 represents the end of shape data of an object, and an EOF code 209 indicates the end of the shape data file.

In the following there will be explained, with reference to a flow chart in FIG. 12, the process of unifying the three-dimensional shape data, utilizing the shape data stored in the 2nd memory device 22 of the apparatus. A program corresponding to this process is stored in the 1st memory device 21 and is executed by the CPU 23.

At first a step S1 reads a shape data file, containing the shape data, from the 2nd memory device 22. The shape data file has a data format as shown in FIG. 11 and contains plural shape data, but it is also possible to fetch plural shape data by reading plural shape data files as indicated by a step S2.

Then a step S3 displays, on the display unit 24, images based on the shape data read and stored in the step S1. In case the shape data are constructed on respectively independent coordinate systems, the operator manipulates the keyboard 26 and the variators 25, while observing the shape data on the display unit 24, thereby matching the positional relationship among such coordinate systems (with parallel translation and rotation if necessary) and effecting alignment in such a manner that all the shape data can be represented in a global coordinate system. Since the parallel translation and the rotation in the three-dimensional space have a freedom of "6", the alignment in the present embodiment is achieved by interactive designation of such 6 freedoms by the operator.

Then a step S4 selects all the shape data (two shape data in the example in FIG. 9), and a step S5 sets a section plane in the overlapping portion of the displayed images. This step S5 is also executed by the manipulation of the keyboard 26 and the variators 25 by the operator, while the shape data displayed on the display unit are observed. Then each shape data is divided into two portions by the above-mentioned section plane, and, in each shape data, there is selected the shape data of a portion to be maintained as the shape data after unification (step S6). In this manner there are selected two partial shape data, on both sides of the section plane. Then a step S7 unifies these two partial shape data. A next step S8 repeats the above-explained unification until all the shape data are unified, and, after the unification of all the shape data, a step S9 releases the shape data of thus unified object, as the shape data file of the format shown in FIG. 11.

Figure 13:
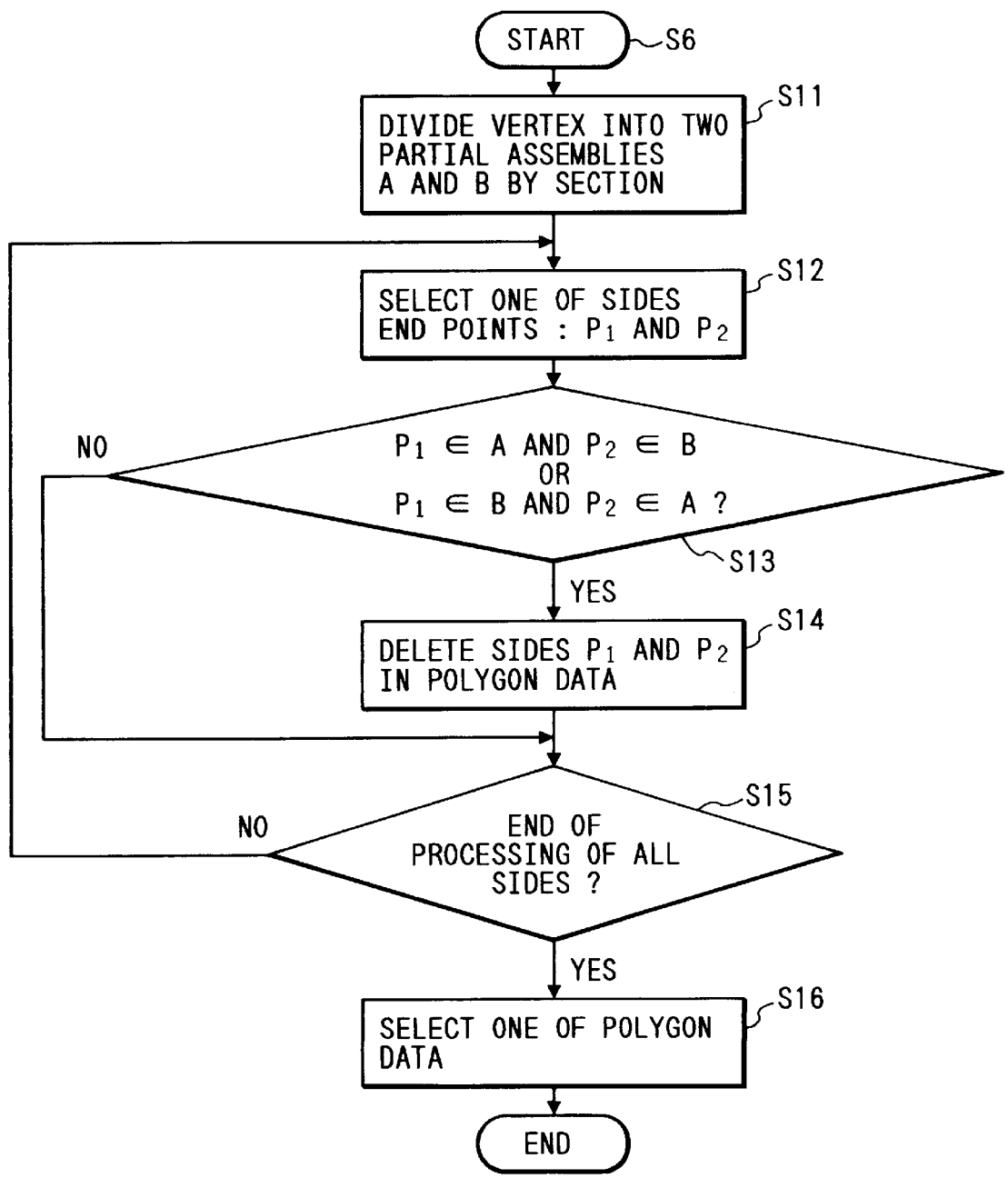
FIG. 13 is a flow chart of a shape division in a step S6 in the three-dimensional shape data unification of the 4th embodiment.

FIG. 13 is a flow chart showing the shape dividing process in the step S6 in FIG. 12, to be executed on each of the two shape data.

At first a step S11 divides the group of vertexes contained in the shape data, into two portions separated by the section plane and represented by:

$$a \times 1 + b\, y\, 1 + c\, z\, 1 + d \geq 0 \text{ and } a \times 1 + b\, y\, 1 + c\, z\, 1 + d < 0 \quad (11)$$

wherein (x1, y1, z1) indicates the three-dimensional coordinate of the vertex and ax+by+cz+d=0 represents the section plane. Thus the set of vertexes is divided into two partial sets A and B. Then a step S12 selects a side or a latus P1P2 connecting the vertexes P1 and P2 of the polygon data in the shape data, and determines whether each of the end points P1, P2 belongs to the set A or B. In case the end points respectively belong to the partial sets A and B, there is discriminated whether $$((P1 \in A) \land (P2 \in B)) \lor ((P1 \in B) \land (P2 \in A)) \quad (12)$$

is true (step S13), and, if it is true, the sequence proceeds to a step S14. As the side P1P2 is cut by the section plane in this case, the step S14 deletes the side P1P2 from the polygon data. This process is executed on all the sides in the polygon data, and the sequence proceeds thereafter from a step S15 to S16 whereby generated are polygon data DA, DB respectively consisting solely of the vertexes belonging to the partial sets A, B. The step S16 selects either of the polygon data DA, DB, to be left as the data after unification. This selection is executed in interactive manner by the operator with the manipulation of the mouse 27 or the keyboard 26 and with the observation of the shapes of the polygon data DA, DB displayed on the display unit 24.

Figure 14:
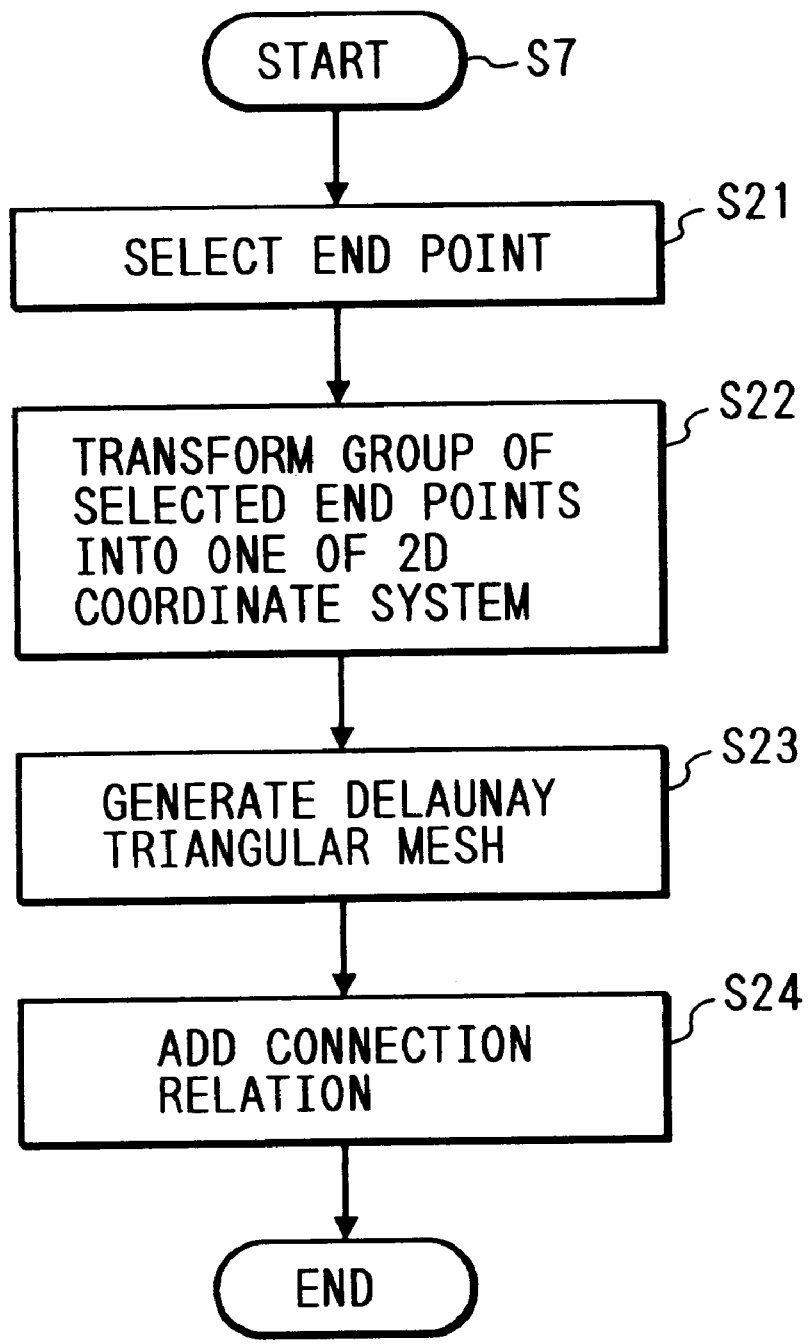
FIG. 14 is a flow chart of a shape unification in a step S7 of the three-dimensional shape data unification of the 4th embodiment.

FIG. 14 is a flow chart of the shape unification process shown in the step S7 in FIG. 12.

At first a step S21 selects, in each of the two partial shape data sectioned by the section plane, the vertexes which were the end points of the sides P1P2 deleted in the step S14 in FIG. 13. Then a step S22 converts the point group selected in the step S21 into a two-dimensional coordinate system. In the present embodiment, the point groups selected from the polygon patches D1 and the other polygon patches D2 are projected onto the coordinate system of the original image from which the polygon patches D1 are generated. A point (x, y, z) represented in the global coordinate system W is converted into a two-dimensional coordinate (I, J) according to an equation:

$$\begin{bmatrix} h \cdot I \\ h \cdot J \\ h \end{bmatrix} = C_1 \cdot R_1^{-1} \cdot \begin{bmatrix} x \\ y \\ z \\ 1 \end{bmatrix} \quad (13)$$

wherein R1 is a 4×4 matrix for conversion for alignment in the step S3 (FIG. 12) for the polygon patch D1, and C1 is a 3×4 matrix for conversion between a three-dimensional coordinate system (coordinate recorded in the shape data file) specific to the polygon patch D1 and the two-dimensional coordinate system constituting the basis of this polygon patch. The conversion parameters CI required in this projection are stored in the photographing condition 27 (FIG. 11) of the shape data describing the polygon patch D1.

Then a step S23 generates a Delaunay triangular mesh on the two-dimensional coordinate system, utilizing the projected point group [cf. A. Sugihara, Information Processing (1989), Vol. 30, No. 9, pp.1067–1075]. Among the sides of the Delaunay triangular mesh, those connecting the vertexes of the polygon patches D1 and D2 are selected and these connections are added to the polygon patches D1 and D2 (step S24). In this manner the gap present between the original polygon patches D1 and D2 is filled by the polygon patches, and the both data can be unified.

Figure 15:
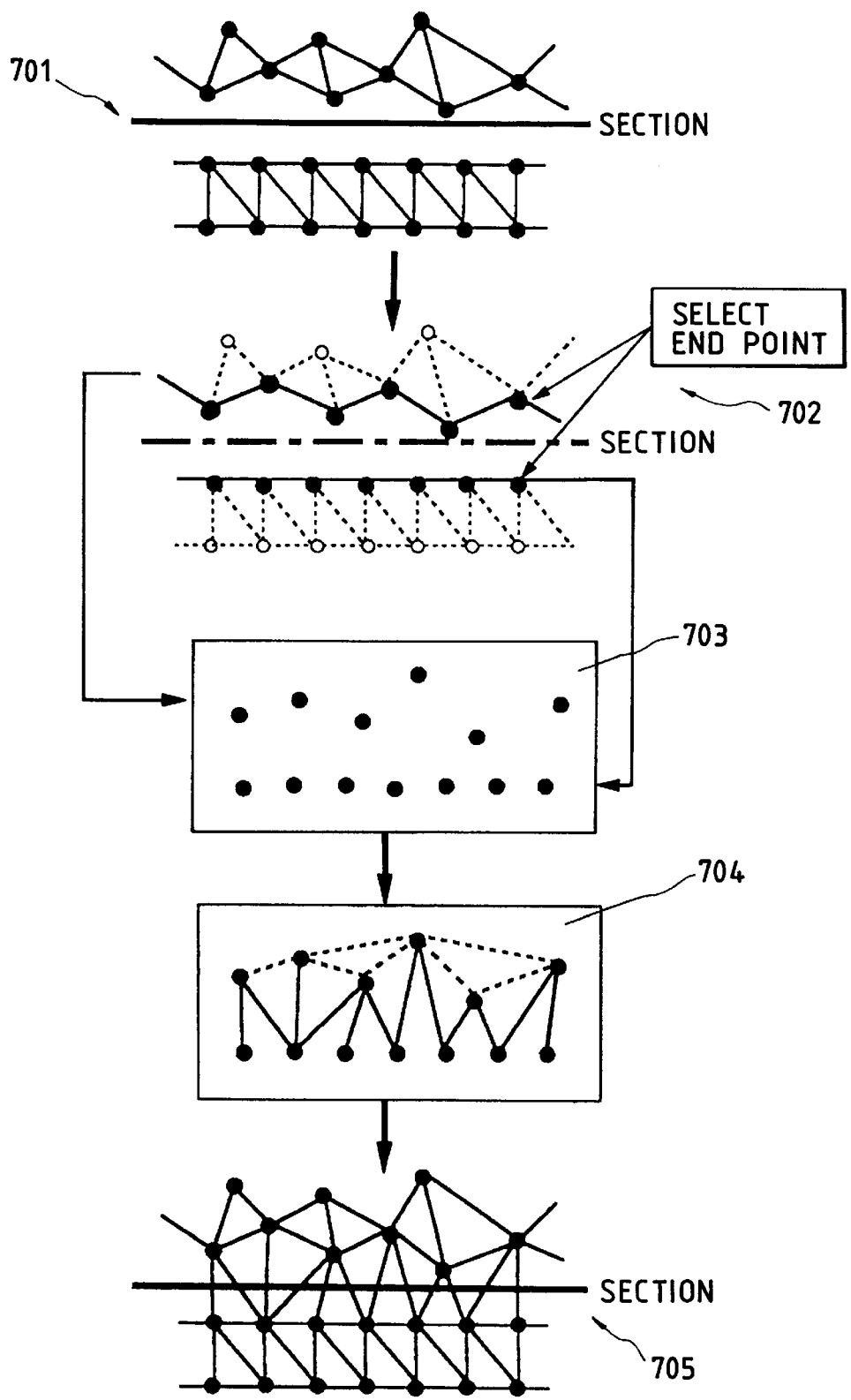
FIG. 15 is a schematic view of the three-dimensional shape data unification in the 4th embodiment.

This process flow is schematically shown in FIG. 15.

In FIG. 15, 701 indicates an example of division of the shape data at the section plane. 702 indicates a result of selection (step S21) of the end points of the sides deleted from the polygon data. 703 indicates an example of conversion (step S22) of thus selected end points into the two-dimensional coordinate system. 704 shows an example of generation of the Delaunary network, utilizing the end points converted into the two-dimensional coordinate system. 705 indicates the selection, among the sides constituting the Delaunay network, of the sides connecting the vertexes of the polygon patches above the section plane and those below the section plane and the addition of the connections based on thus selected sides. In this manner the shape data are mutually connected across the section plane.

(e) 5th Embodiment

Figure 16:
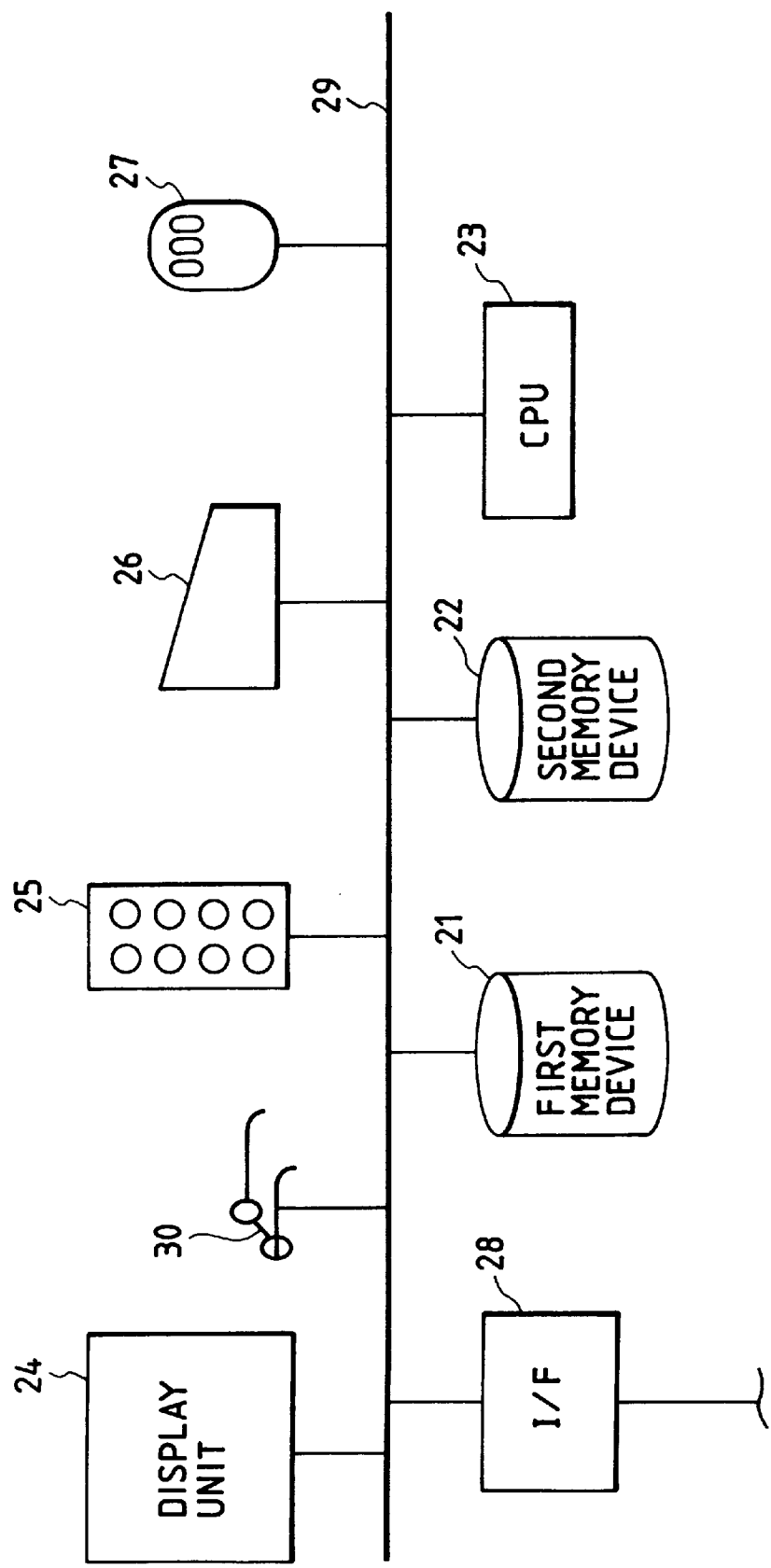
FIG. 16 is a block diagram of a three-dimensional shape data unifying apparatus of a 5th embodiment.

FIG. 16 is a schematic block diagram of a three-dimensional shape data unifying apparatus constituting a 5th embodiment of the present invention, wherein components same as those in FIG. 10 are represented by same numbers and will not be explained further.

In FIG. 16 there are provided liquid crystal shutter goggles or polarizing filter goggles 30, which are used in combination with the display unit 24 for stereoscopic observation of the three-dimensional data, whereby the operator can efficiently execute the operation of the step S3 or S5 in FIG. 12.

Figure 17:
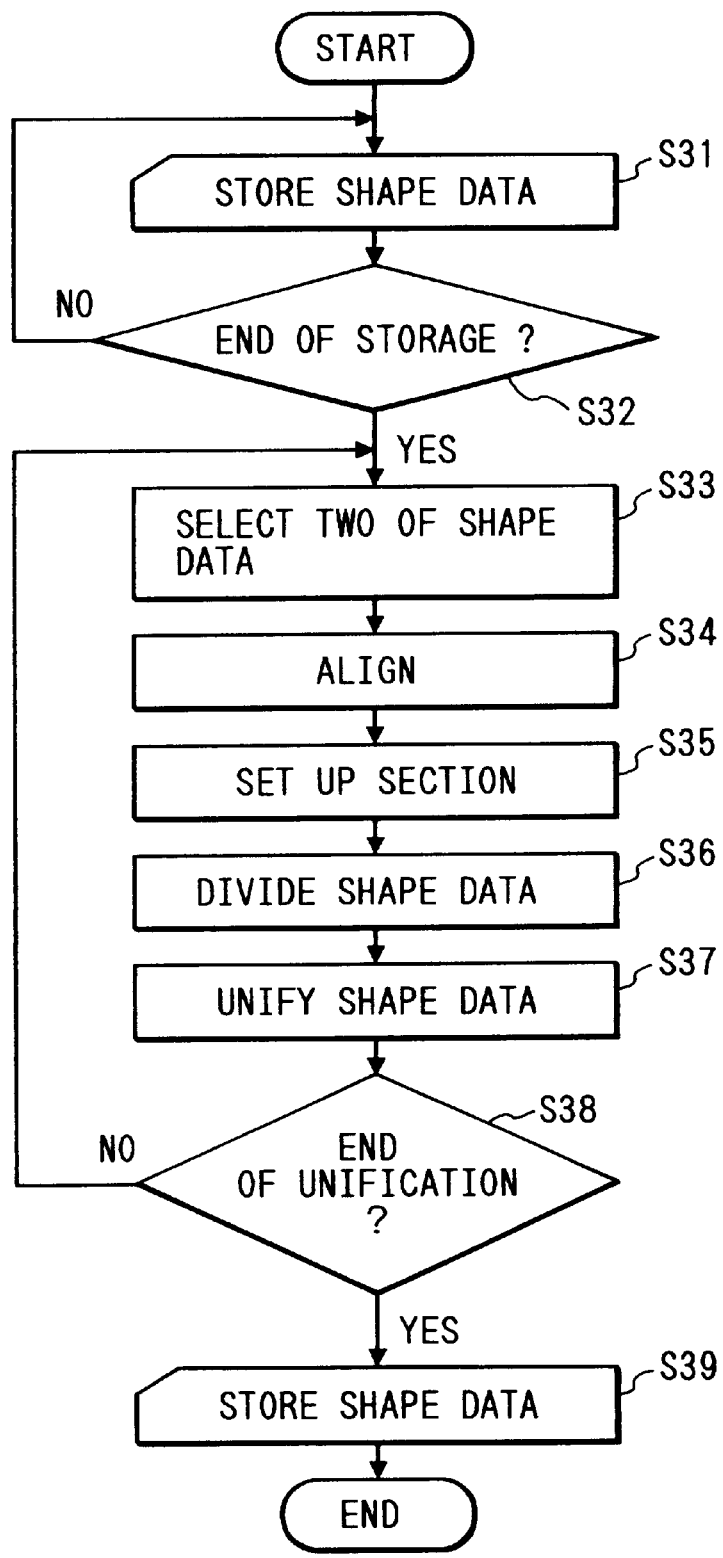
FIG. 17 is a flow chart of the three-dimensional shape data unification in the 5th embodiment.

Also in this case, the process shown in FIG. 12 may be replaced by a process shown in FIG. 17 for achieving the same effect.

In FIG. 17, steps S31, S32 and S35–S39 respectively correspond to the steps S1, S2 and S5–S9 in FIG. 12, and the steps S3, S4 therein are merely replaced in order as steps S33, S34 in FIG. 17. Consequently, in the flow shown in FIG. 17, after the selection of two shape data to be unified, the alignment is executed only on these two shape data.

The present invention is applicable not only to a system consisting of plural equipment but also to an apparatus consisting solely of a single equipment. Also the present invention is applicable to a case where the present invention is achieved by the supply of a program to a system or an apparatus.

As explained in the foregoing, the present embodiment is capable of generating geometrical data without void portion, representing the shape of the object, by unifying polygon patch data, generated independently from distanced image data obtained by observing the object from plural directions, into single data. Such geometrical data allows to improve the functions of the shape model utilizable in the CAD or in the virtual reality.

The 4th and 5th embodiments explained above allow to unify plural three-dimensional shape data, independently generated from the distanced image data entered from plural directions, into single data, thereby providing complete geometrical data of the object.

Also the 4th and 5th embodiments allow to easily obtain complete shape data of the object, based on the three-dimensional shape data obtained by observing the object from plural directions.

(f) 6th Embodiment

The basic configuration of a hierarchic three-dimensional shape data unifying apparatus of a 6th embodiment is same as that shown in FIG. 10.

Figure 18:
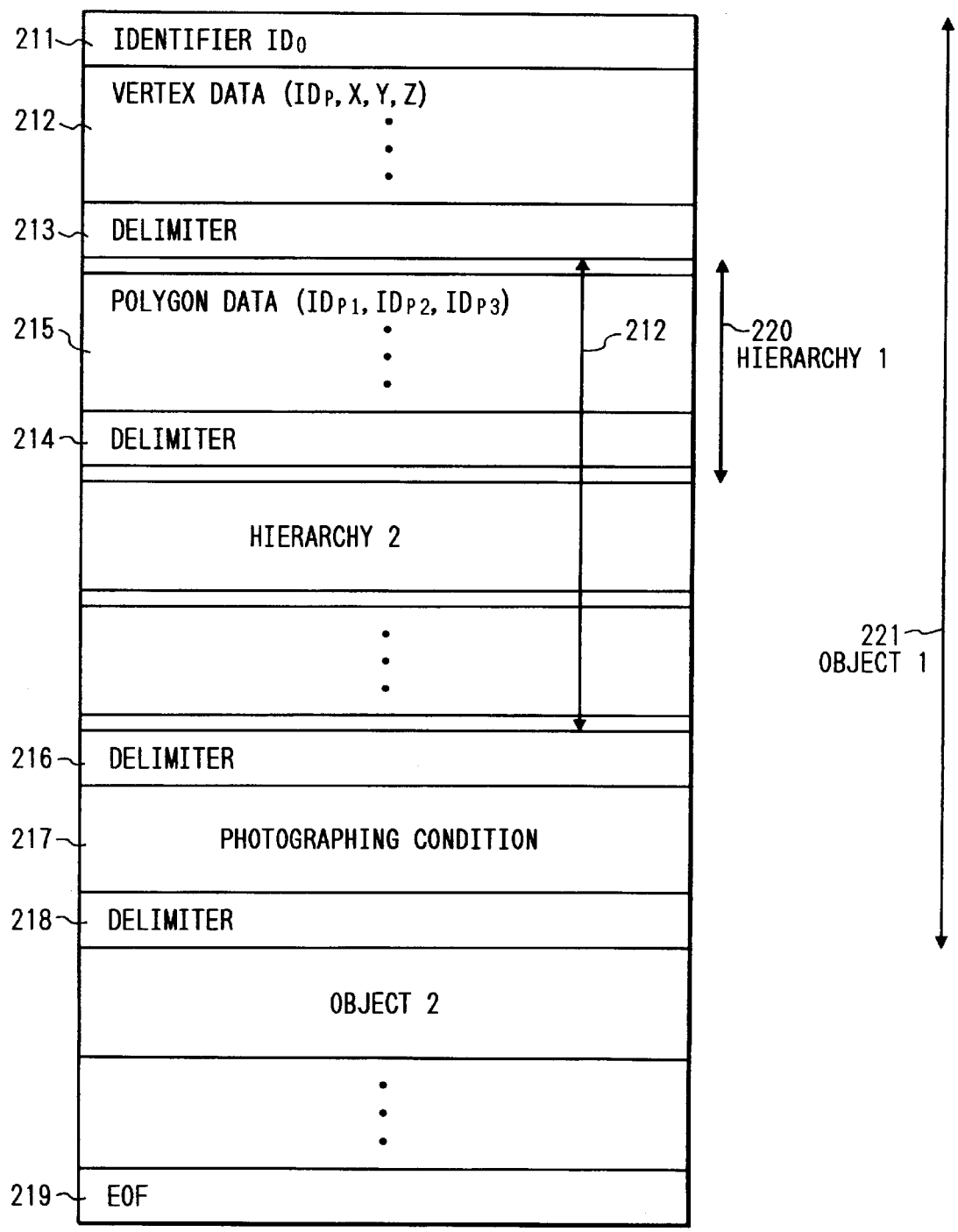
FIG. 18 is a view showing the data configuration of a hierarchic shape data file, or a hierarchic triangular polygon data, to be stored in a 2nd memory device 12 in a 6th embodiment.

Also FIG. 18 shows the data configuration of a hierarchic shape data file, or hierarchic triangular polygon data, stored in the 2nd memory device 22. In FIG. 18, data 221 represents the shape of an object I and includes an identifier 211 (IDO), vertex coordinate 212 and connection information 222 between the vertexes. Data 220 represents the shape of a hierarchic level 1 among the plural hierarchic levels, and contains connection information (polygon data 215) of a set of vertexes.

A delimiter 218 represents the partition of each object information, and can be used for storing the polygon data of plural objects. Vertex data 212 contains three-dimensional coordinate (X, Y, Z), with an identifier IDp, of all the vertexes contained in the object. A delimiter 213 represents the partition between the vertex coordinate 212 and the vertex connection information 222. 215 indicates connection information of the polygon data for a hierarchic level, wherein a triangle is represented by a set of three vertex identifiers. A delimiter 216 represents the partition between the connection information 222 and the photographing condition 217. A code 218 indicates the end of the shape data, and a code 219 indicates the end of the shape data file.

In the following there will be explained, with reference to a flow chart in FIG. 19, the procedure of unifying the three-dimensional shape data, utilizing the shape data stored in the 2nd memory device 22. A program corresponding to this flow chart is stored in the 1st memory device 21.

At first a step S301 reads plural hierarchic shape data from the 2nd memory device 22. In the subsequent unifying process, some or all of such plural hierarchic shape data are unified. Upon completion of the storage of the hierarchic shape data, the sequence proceeds from a step S302 to S303.

The step S303 selects one of the plural hierarchic levels for the process in the subsequent steps S304 to S306, and displays the shape data of the selected level on the display unit 24. As a result, a three-dimensional shape is displayed on the display unit 24, according to the data of the level selected in the step S301 from the plural hierarchic shape data.

In case the read shape data are respectively constructed on the independent coordinate systems, the operator manipulates the keyboard 26 and the variators 25 while observing the shape data of the level selected in the step S303, on the display unit 24, thereby matching the respective coordinate systems, with parallel translation and rotation if necessary, and effecting the alignment in such a manner that all the data can be represented in a global coordinate system (step S304). More specifically, the positional relationship of the two shape images to be unified is set by parallel translation and/or rotation.

Through the foregoing process, the shape data to be unified are represented in a single global coordinate system W. Then a step S305 selects two shape data having mutually overlapping portions, and a step S306 sets a section plane in the overlapping portions of the shape data to be unified. This step is also executed by the manipulation of the keyboard 26 and the variators 25 by the operator under the observation of the shapes displayed on the display unit.

Then a step S307 selects a hierarchic level L, among the plural levels of the shape data stored in the step S301. Then a step S308 divides each of the shape data of the hierarchic level L into two portions, by the section plane set in the step S306, and selects partial shape data to be left in the data after the unification. In this manner there are selected two partial shape data on both sides of the section plane. A step S309 unifies the two partial shape data, selected in the step S308. As the result of this unification, additions are made to the vertex data and the polygon data shown in FIG. 18.

The above-explained process for a hierarchic level in the steps S307 to S309 is repeated for the data of all the hierarchic levels (step S310).

Furthermore, the above-explained unification is repeated until all the shapes to be unified a re unified (step S311). As the alignment in the step S304 is reflected in the vertex data 212 of the shape data, such alignment need not be repeated for other hierarchic levels. Finally a step S312 releases thus unified shape data of the object to the shape data file.

The shape division by the section plane in the foregoing step S308 is achieved according to the flow chart shown in FIG. 13, and the unification process in the step S309 is achieved according to the flow chart shown in FIG. 14.

Figure 20:
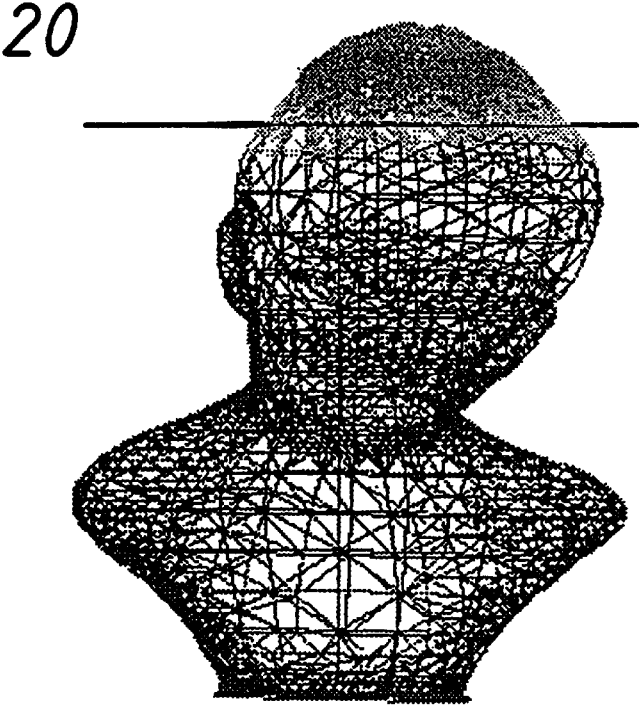
FIGS. 20 to 22 are views showing an example of application of the 6th embodiment to hierarchic shape data with three hierarchic levels.
Figure 21:
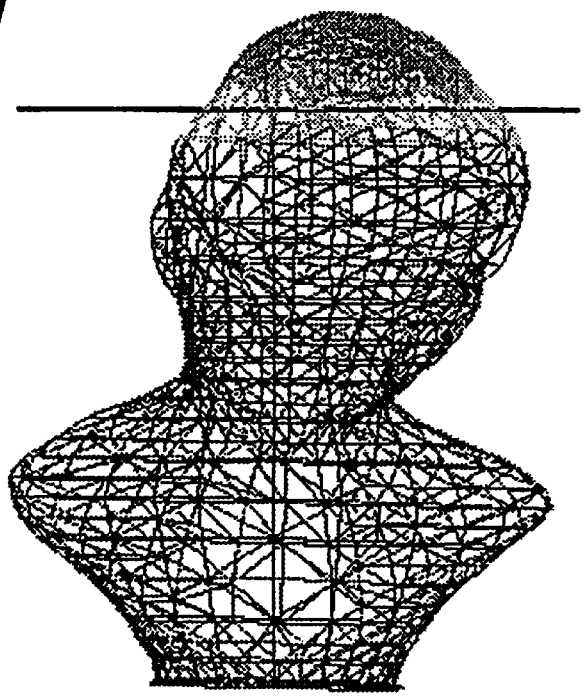
Figure 22:
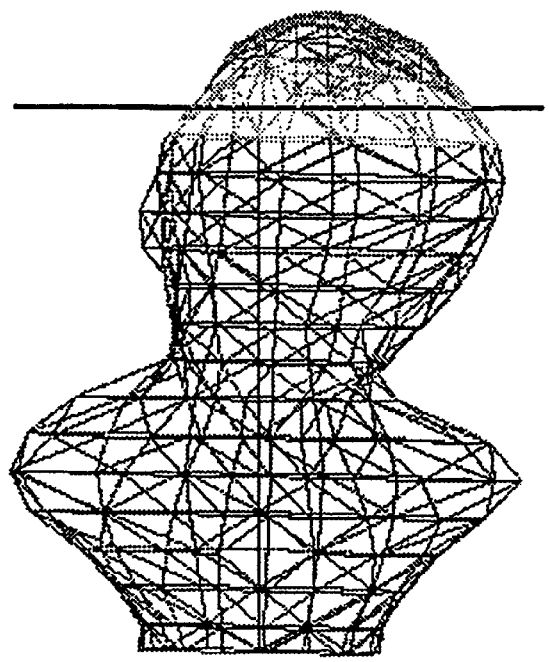

FIGS. 20, 21 and 22 show the results of unification in case the present embodiment is applied to the hierarchic shape data having three levels, in which FIG. 20 shows the highest hierarchic level and FIGS. 21 and 22 show the levels in the descending order.

As explained in the foregoing, the 6th embodiment allows to unify the plural shape data in all the hierarchic levels, thereby achieving unification of the hierarchic three-dimensional shape data.

(g) 7th Embodiment

Figure 23:
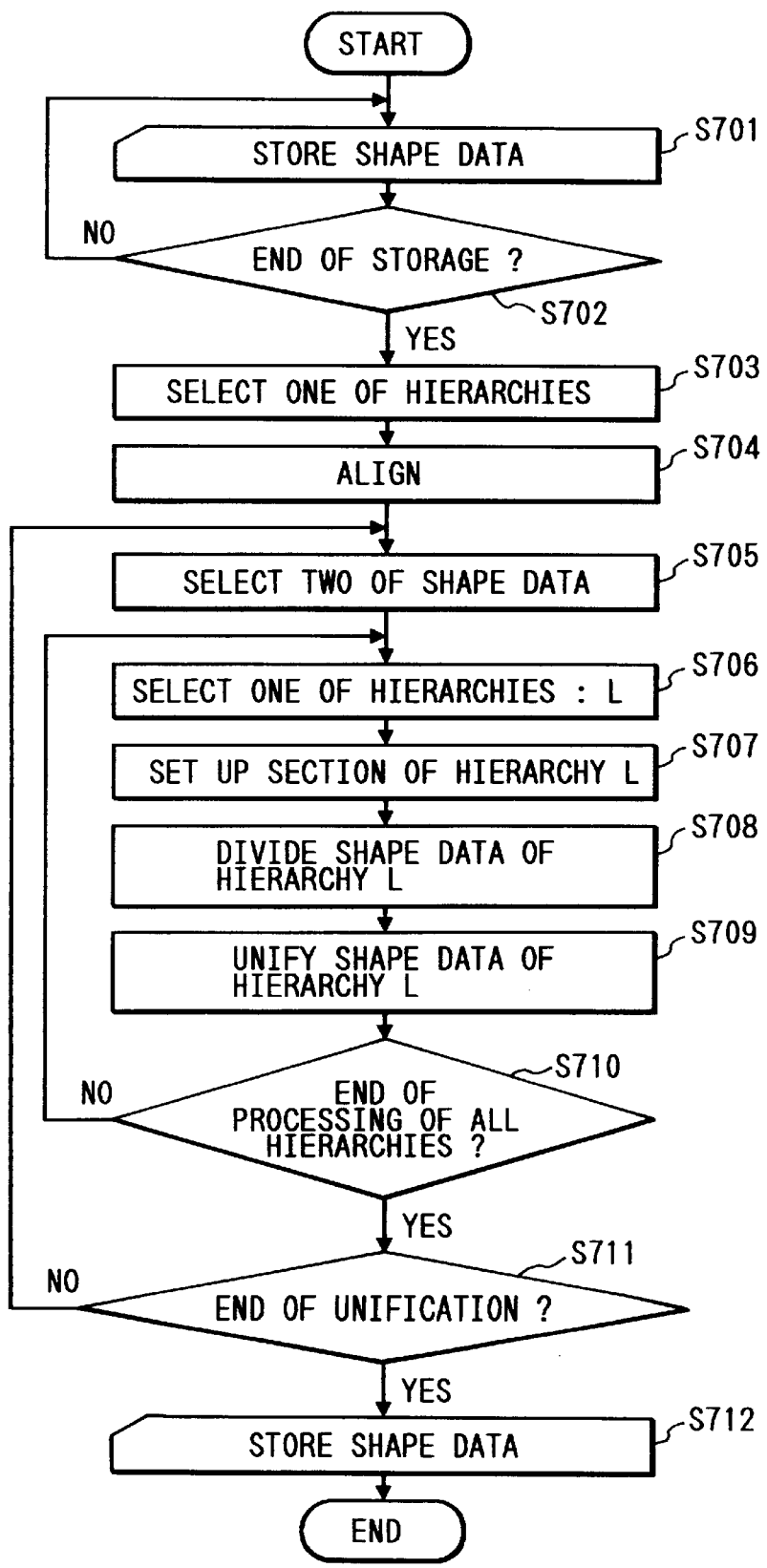
FIG. 23 is a flow chart of a hierarchic shape data unifying method in a 7th embodiment.

In the foregoing 6th embodiment, the position of the section plane is same for all the hierarchic levels, but it is also possible to change the position of the section plane for each hierarchic level. FIG. 23 is a flow chart showing the hierarchic shape data unifying method of a 7th embodiment.

Figure 19:
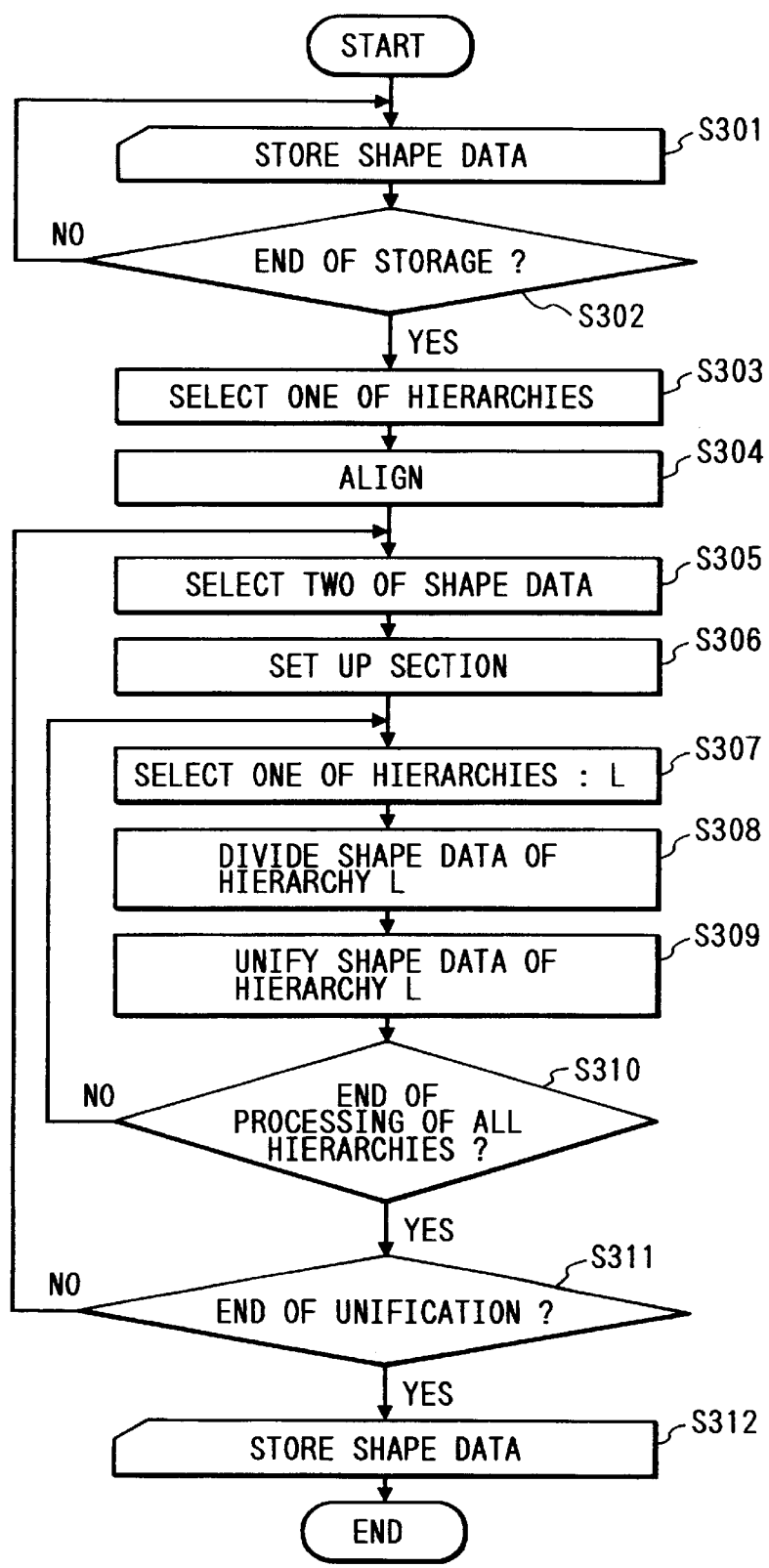
FIG. 19 is a flow chart showing the three-dimensional shape data unifying process in the 6th embodiment.

In FIG. 23, steps S701, S702, S703, S704, S705, S706, S707, S708, S709, S710, S711 and S712 are respectively same as, in FIG. 19, the steps S301, S302, S303, S304, S305, S306, S307, S308, S309, S310, S311 and S312.

It is rendered possible to set an appropriate section plane for each hierarchic level, as the setting of the section plane is executed in the shape unifying process loop in each hierarchic level.

In the 6th and 7th embodiments, the shape data of all the hierarchic levels are stored prior to the start of the entire process, but it is also possible to store the data of a single hierarchic level from the hierarchic shape data of plural levels and to effect unification of the shape data in each hierarchic level.

As explained in the foregoing, the 6th and 7th embodiments allow to unify plural hierarchic shape data, having plural polygon patches different in the precision of object presentation, thereby generating hierarchic shape data of the object without the void portion. Consequently there can be achieved improvement in the functions of the shape model utilizable in CAD or in virtual reality.

(h) 8th Embodiment

In the foregoing 6th and 7th embodiments, plural three-dimensional geometrical shapes are unified by dividing plural three-dimensional shape data with a section plane and mutually connecting thus divided three-dimensional geometrical shapes.

In such unifying method, the connection of the geometrical shapes is achieved by setting a section plane in the overlapping portions of two shape models, extracting the vertexes in the gap area between the geometrical shapes separated by the section plane (i.e. vertexes adjacent to the section plane), and preparing new triangular patches having vertexes on such adjacent points. In these operations, if a side connecting the vertexes of a triangular patch crosses the section plane, one of the end points of the side is designated as the adjacent point to the section plane. For this reason, for generating a shape data without void portion from the two shape data to be unified, the section plane has to be set in a portion where the three-dimensional shapes to be unified mutually overlap.

Figure 24:
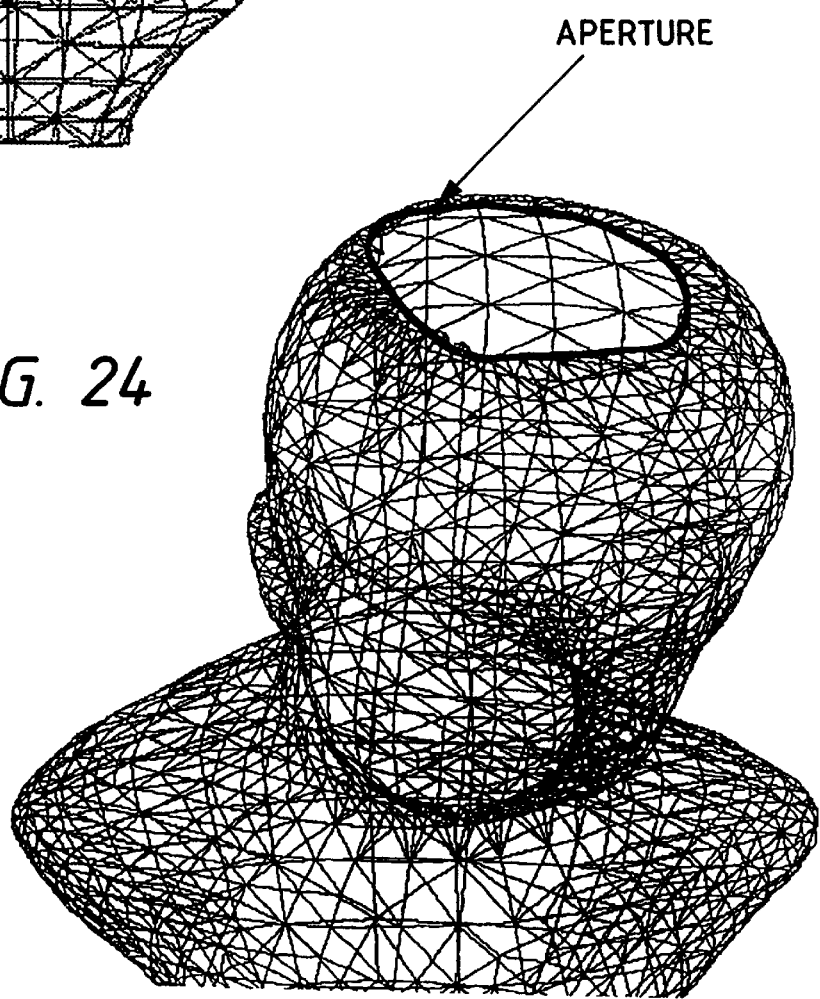
FIG. 24 is a view showing an aperture contained in a three-dimensional geometrical shape.

On the other hand, as the conventional method for entering the distanced image utilizes two-dimensional optical scanning by the rotation of a mirror or a fixed camera, it is not possible to measure the rear side, the upper or bottom face of the object, so that the three-dimensional geometrical shape prepared from the result of measurement always has an aperture. FIG. 24 illustrates an aperture contained in the three-dimensional geometrical shape.

Consequently, in case of unifying a shape having an aperture as explained above and another shape filling such aperture in the method of the 6th or 7th embodiment, there are encountered following two drawbacks in the extraction of the points adjacent to the section plane.

(1) In case the operator erroneously sets the section plane so as to cross the aperture:
the operator cannot know that the setting of the section plane is inappropriate, as detection is not conducted whether the section plane crosses the aperture.

(2) In case the operator intentionally sets the section plane so as to cross the aperture:
as the vertexes of the aperture are not used as the vertexes of the triangular patches connecting the two geometrical shapes, there will result a portion where the triangular patches are not generated. As a result, the unified geometrical shape contains a void portion.

Consequently the 8th embodiment enables the operator to know whether the position of the section plane, set for unifying the plural shape data, is appropriate, and, even in case the position of the section plane is inappropriate, enables to unify the polygon patch data, generated independently from the distanced image data entered from plural directions, thereby generating geometrical shape data of the object without void portion.

In the following there will be briefly explained the process of the 8th embodiment.

In the three-dimensional shape data unifying apparatus of the 8th embodiment, there are entered triangular polygon data, generated from the distanced image data of planar type and representing the object. Such triangular polygon data contain the vertex coordinates, coordinate of each vertex in the distanced image, information on the connection of the vertexes, and photographing condition (condition for taking the distanced image constituting the basis of the shape data).

An entered geometrical data may represent only a partial shape of the object. For example, the shape data a generated from a distanced image obtained by observing the object from above does not show the bottom shape of the object. For this reason there are entered plural three-dimensional polygon data, representing the shape of the object from different directions. The shape data generated from the distanced image has an open shell structure, and the end points of the polygon sides constituting the aperture are extracted for the subsequent process.

The shape data to be unified may be constructed on the respectively independent coordinate systems. In such case the coordinate systems are matched in the positional relationship, by parallel translation and rotation, and are mutually aligned in such a manner that all the data can be represented in a global coordinate system. In the present embodiment, this process is executed by interactive operations of the operator.

Then a section plane is set in the global coordinate system by interactive operations of the operator. As the two shape data are subsequently unified across this section plane as a boundary, the section plane has to be set in a position in which the two shape data to be unified mutually overlap and which does not cross the aperture in each shape data. If the operator does not set the section plane properly (namely if the set section plane crosses the aperture of the geometrical shape), an alarm is displayed and the sequence returns to a step for setting the section plane. On the other hand, if the section plane is properly set (namely if the section plane does not cross the aperture of the geometrical shape), each shape data is divided by the section plane into two portions, of which one is selected. Consequently a partial shape data is selected from each of the two shape data.

Then these two partial shape data are unified. For this purpose, within a partial shape data, the data of the points adjacent to the section plane are converted into the three-dimensional coordinate system of the other partial shape data. Then the above-mentioned point data are projected, together with the data of the points adjacent to the section plane within the latter partial shape data, onto a suitable two-dimensional coordinate system, and a Delaunay triangular mesh is generated with thus projected point data. The triangular mesh thus generated is connected according to the connections of the original point data adjacent to the section plane, and triangular patches are generated in a gap area across the section plane. In this manner the original two shape data are unified, by means of the two partial shape data and the generated triangular patches.

Finally thus unified shape data of the object are released for utilization in other applications.

In the following there will be explained the three-dimensional shape unifying apparatus of the present embodiment. The configuration of the above-mentioned apparatus is same as that of the 6th embodiment shown in FIG. 10, and will not, therefore, be explained further.

In the following there will be explained, with reference to a flow chart in FIG. 25, the process of unifying the three-dimensional shape data, utilizing the shape data stored in the 2nd memory device 22. A program corresponding to this flow chart is stored in the 1st memory device 21.

At first a step S801 reads plural shape data from the 2nd memory device 22. After completion of the storage, the sequence proceeds from a step S802 to S803. The step S803 extracts vertexes of the aperture in each geometrical shape model. In case the read shape data are constructed on respectively independent coordinate systems, the operator manipulates the keyboard 26 and the variators 25, in a step S804, while observing the shape data displayed on the display device, thereby matching the respective coordinate system by parallel translation and rotation and achieving alignment in such a manner that all the data can be represented in a global coordinate system. In the following it is assumed that all the data are represented by the above-mentioned global coordinate system W.

Then a step S805 selects two shape data having mutually overlapping portions, and a step S806 sets a section plane in the overlapping portions. This step is also conducted by the manipulation of the keyboard 26 and the variators 25 by the operator, under the observation of the shapes displayed on the display unit. Then a step S807 divides each shape data into two portions by the section plane, and selects one of the partial shape data, to be left in the data after unification. In this manner there are selected two partial shape data on both sides of the section plane.

Then a step S808 verifies whether the set section plane crosses an aperture in the shape data to be unified, and the sequence proceeds to a step S811 or S810 respectively if the section plane crosses the aperture in the shape data to be unified or not (step S809). The step S811 displays, on the display unit 24, a message that the section plane has to be reset, and the sequence returns to the step S806 for resetting the section plane.

The step S810 executes unification of the two partial shape data divided in the step S807. Then the unification in the above-explained process is repeated until all the shapes to be unified are unified. Finally a step S813 releases thus unified shape data of the object to the shape data file.

Figure 26:
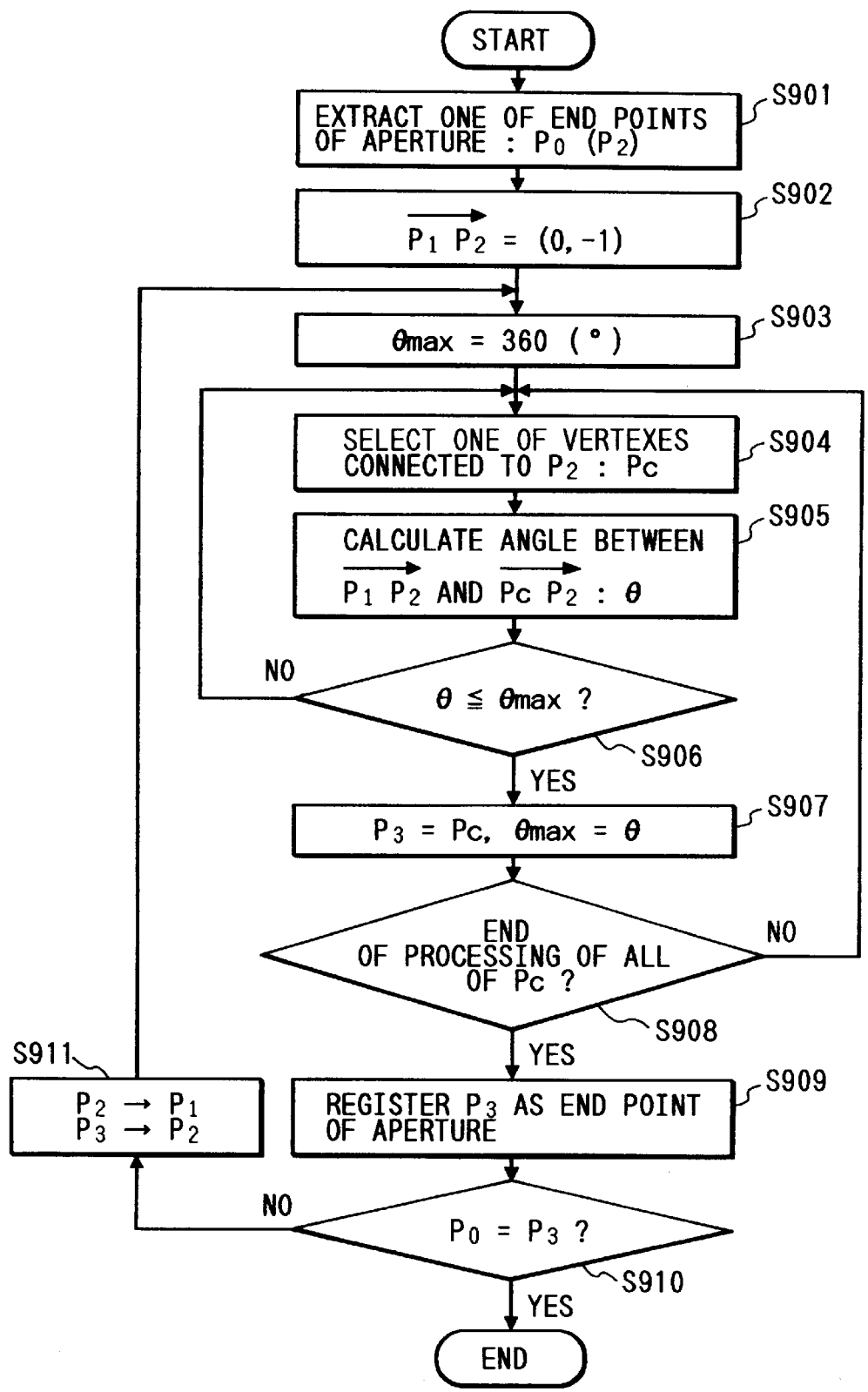
FIG. 26 is a flow chart of an extraction process for the end points of aperture in the 8th embodiment.

In the following there will be given a detailed explanation on the extraction of the end points of the aperture in the above-mentioned step S803. FIG. 26 is a flow chart showing the procedure of extraction of end points of the aperture in the 8th embodiment. The process shown in FIG. 26 is applied to each shape data entered in the step S801.

At first a step S901 extracts one of the end points of the aperture. In the present embodiment, the coordinate of each vertex in the shape data is represented by (xd, yd), and, among the vertexes with a maximum xd, a vertex with a maximum yd is selected as an end point of the aperture. This point is named PO (=P2). Then a step S902 sets the coordinate of a point P1 in such a manner that the vector P1P2 becomes (0, −1). Also a step S903 sets a variable θmax at 360°.

Then a step S904 selects another end point Pc of a side of the triangular patch having the point P2 as a vertex. A step S905 determines the angle θ between the vectors P1P2 and PcP2. θ is at least equal to 0° but less than 360°. A next step S906 compares θ and θmax, and, if θ≦θmax, a step S907 stores the point Pc and a point P3 and renews θmax by the value of θ, but, if θ>θmax, the sequence returns to the step S904. The process of the steps S904 to S907 is repeated for all the vertexes connected to the point P2 (step S908).

Upon completion of the process on all the points Pc, a step S909 registers the point P3 as an end point of the aperture. If this point P3 is same as PO, the extraction of the end points of the aperture is terminated, but, if not same, the sequence proceeds to a step S911 (step S910). The step S911 replaces the point P1 by P2 and the point P3 by P2, and the sequence then returns to the step S903. The above-explained process for extracting the aperture end points is similar to the boundary tracing in the image processing [Introduction to computer image processing, pp.83–85, Soken Shuppan].

Figure 35A:
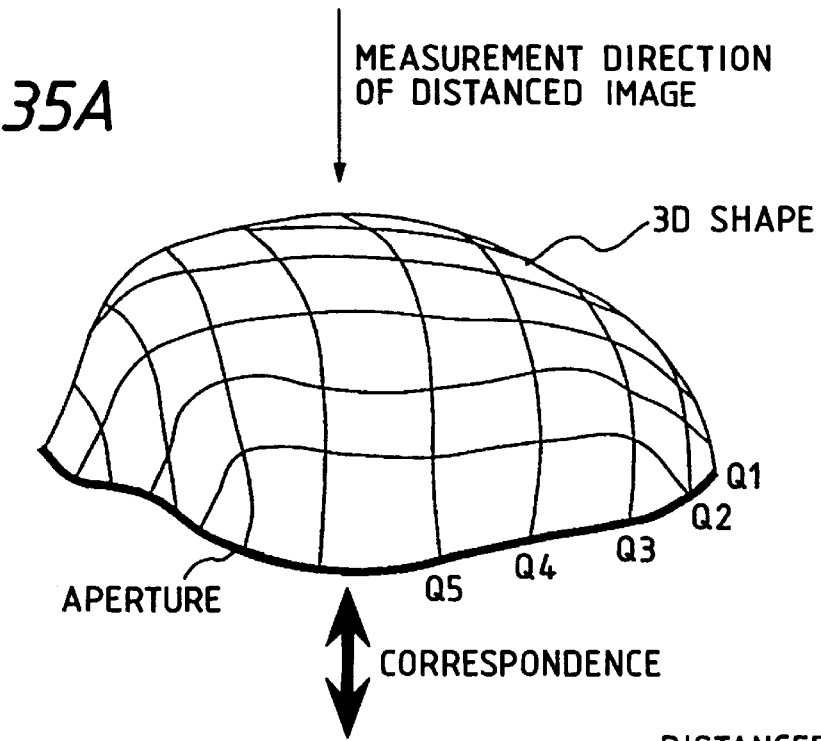
FIGS. 35A and 35B are views showing the concept of end point extraction of the aperture in the 8th embodiment.
Figure 35B:
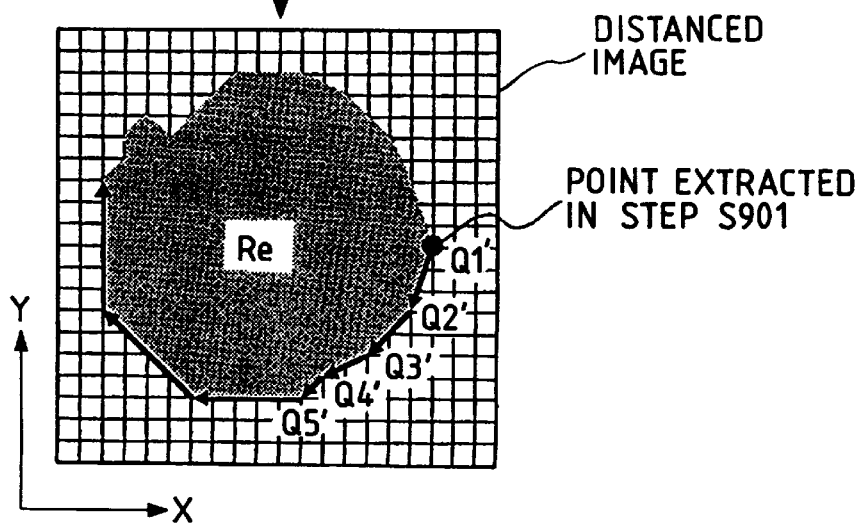

FIGS. 35A and 35B illustrate the concept of extraction of the aperture end points in the present embodiment. A hatched area on the distanced image in FIG. 35B shows a region Re containing points obtained by projecting the vertexes of the three-dimensional shape in FIG. 35A onto the distanced image. The end points (Q1, Q2, Q3, . . . ) of the aperture connected in a closed loop by the sides of the planar patches, and the points on the distanced image, corresponding to the end points of the aperture, are present on the contour of the region Re. The method of the present embodiment determines the end points of the aperture in the order of Q1→Q2→Q3→. . . by tracing the projected points, present on this contour, of the vertexes of the patch model in the order of Q1'→Q2'→Q3'→. . . .

The step S901 determines a suitable point (Q1 in the three-dimensional shape in FIG. 35A) serving as the start point of extraction. In the method of the present embodiment, the coordinates of the vertexes of the patch model projected onto the distanced image are surveyed, and there is determined the point Q1 (projected point being Q1') which has the maximum Y-coordinate among the points with the maximum X-coordinate. As the point Q1' is on the contour of the region Re, the point Q1 constitutes one of the end points of the aperture.

A projected point P'(I, J) on the distanced image corresponding to a vertex P(Xv, Yv, Zv) on the three-dimensional shape is represented as follows, utilizing a transformation matrix C from the global coordinate system to the distanced image:

$$(h*I, h*J, h)^1 = C(Xv, Yv, Zv)^1 \qquad (14)$$

Otherwise, coordinate information on the distanced image may be added to the vertex data, within the polygon data shown in FIG. 18. Since the three-dimensional patch model is in general prepared from distanced images, the coordinate of the point on the distanced image corresponding to each vertex is already known. Consequently the vertex data are stored in a format (IDp, X, Y, Z, I, J). In this case it is no longer necessary to calculate the coordinate on the distanced image by the foregoing equation, so that the process time required for extraction of the aperture end points can be reduced.

The shape division in the step S807 is executed, on each of the two shape data, by a process shown in FIG. 13, which is same as already explained in the 4th embodiment and will not, therefore, be explained further.

Figure 27:
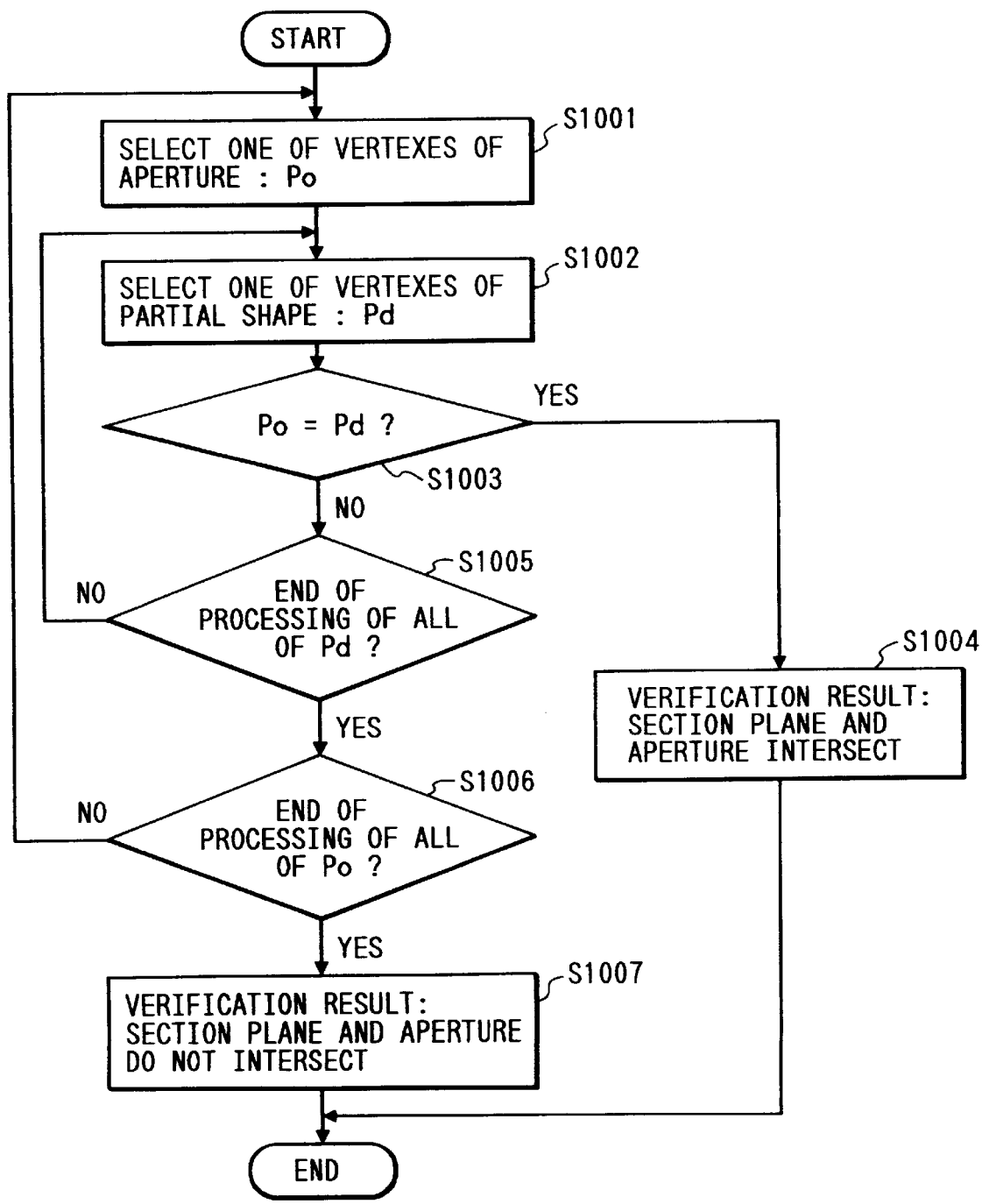
FIG. 27 is a flow chart of a verification process for the position of section plane in the 8th embodiment.

In the following there will be further explained the verification of the position of the section plane in the step S808. FIG. 27 is a flow chart showing this verification process, which is applied to each of the two partial shapes to be unified, selected in the step S807.

At first a vertex PO is selected from the set of vertexes of the aperture, extracted in the step S803 (step S1001). Then a vertex Pd is selected among the vertexes of the triangular patches constituting the partial shape (step S1002). Then a step S1003 discriminates whether PO is same as Pd, and, if same, the position of the section plane is verified as crossing the aperture of the considered geometrical shape (step S1004).

On the other hand, if the step S1003 identifies that the points PO and Pd are not same, a step S1005 discriminates whether the process has been completed for all the vertexes of the partial shape, and, if not, the sequence returns to the step S1002. If the process has been completed for all the points Pd, a step S1006 discriminates whether the process has been completed for all the vertexes of the aperture, and, if not, the sequence returns to the step S1001, but, if completed, the sequence proceeds to a step S1007 for verifying that the section plane does not cross the aperture of the considered geometrical shape.

The shape unification of the step S810 is executed on each of the two partial shapes to be unified, selected in the step S807, according to the process shown in FIG. 14, which is same as already explained in the 4th embodiment and will not, therefore, be explained further.

As explained in the foregoing, the 8th embodiment allows the operator to know whether the section plane, set for unifying plural shape data, is positioned appropriately.

(i) 9th Embodiment

Figure 28:
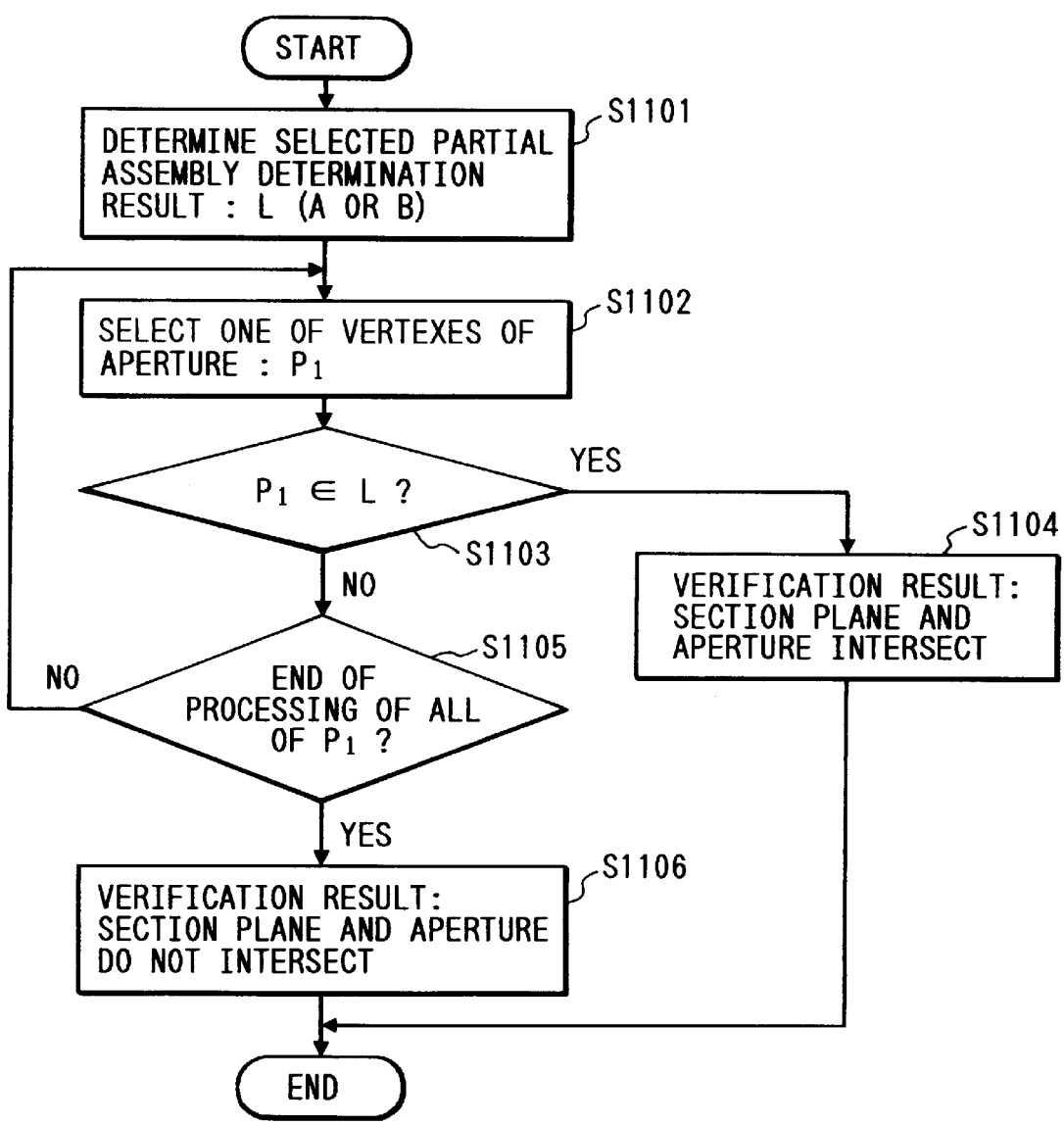
FIG. 28 is a flow chart of a verification process for the section plane in a 9th embodiment.

The 9th embodiment is different from the 8th in the method of verification of the position of the section plane. In this embodiment, the verification process is executed, on each of the shape data to be unified, according to the process shown in FIG. 28.

At first a step S1101 selects a partial set L (A or B) containing the polygon data to be left after the unification, selected by the operator in the step S16 (FIG. 13) of the shape division process (step S807). Then a step S1102 selects a point P1 in the set of vertexes of the aperture of the above-mentioned polygon data, and a step S1103 discriminates whether the point P1 belongs to the partial set L. If affirmative, a step S1104 verifies that the section plane crosses the aperture of the considered geometrical shape.

On the other hand, if the point P1 is identified as not belonging to the partial set L, a step S1105 discriminates whether the process has been completed for all the vertexes of the aperture, and, if completed, the sequence proceeds to a step S1106, but, if not, the sequence returns to the step S1102. The step S1106 verifies that the section plane does not cross the aperture of the considered geometrical shape.

(j) 10th Embodiment

In the 8th and 9th embodiments, if the position of the section plane is inappropriate, namely if the section plane crosses the aperture of the shape data to be unified, the unification of the shape data is not conducted.

However, if the shape model to be unified is smooth in the vicinity of the section plane or if the section plane is positioned in the vicinity of the aperture of the shape data to be unified, it is still possible to regard a part of the vertexes of the aperture as the vertexes adjacent to the section plane, for the purpose of connecting the shape data with triangular patches. In this 10th embodiment there will be explained the unification of the shape data even when the section plane crosses the aperture of the shape data.

Figure 25:
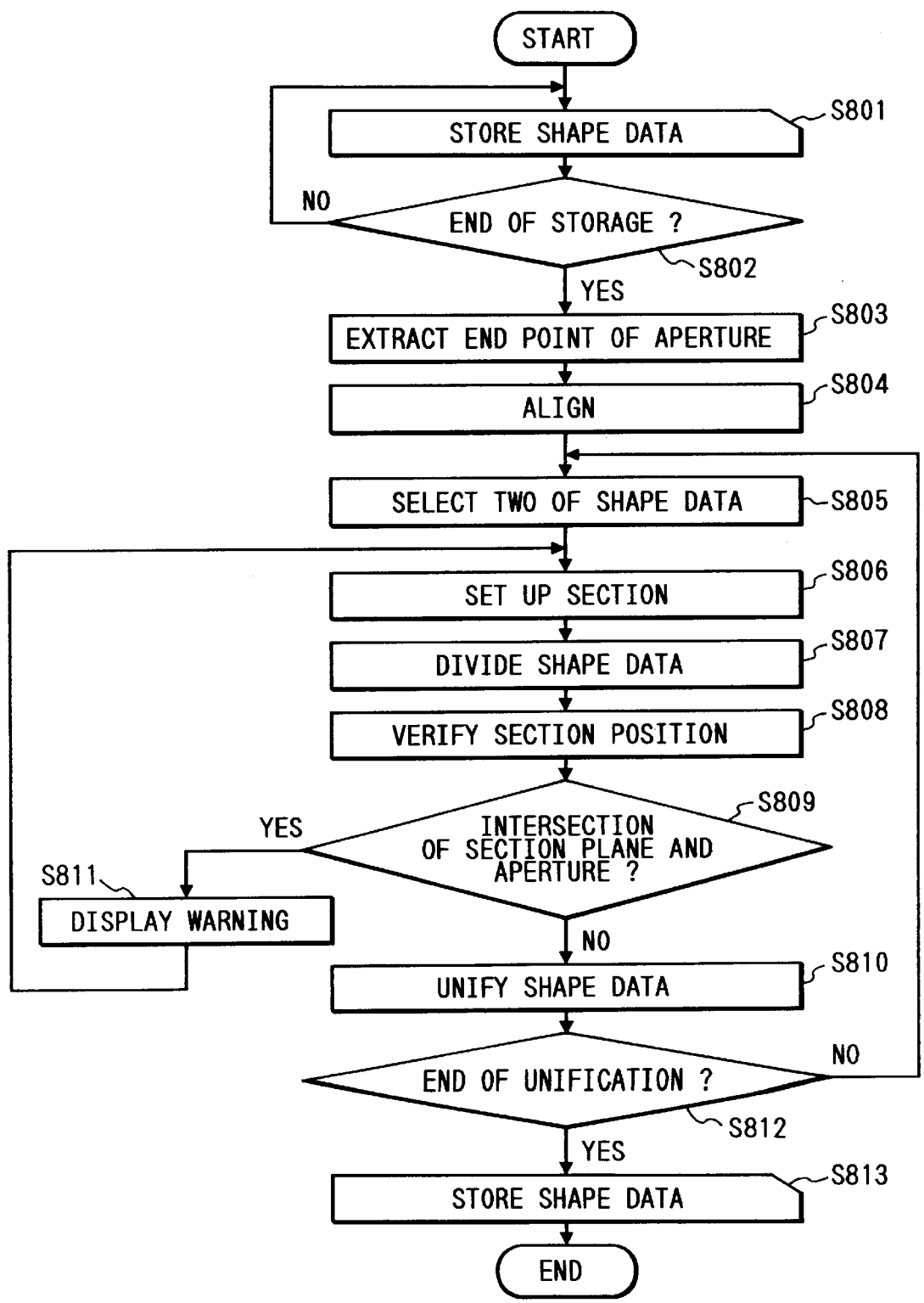
FIG. 25 is a flow chart of a three-dimensional shape data unifying process in an 8th embodiment.
Figure 29:
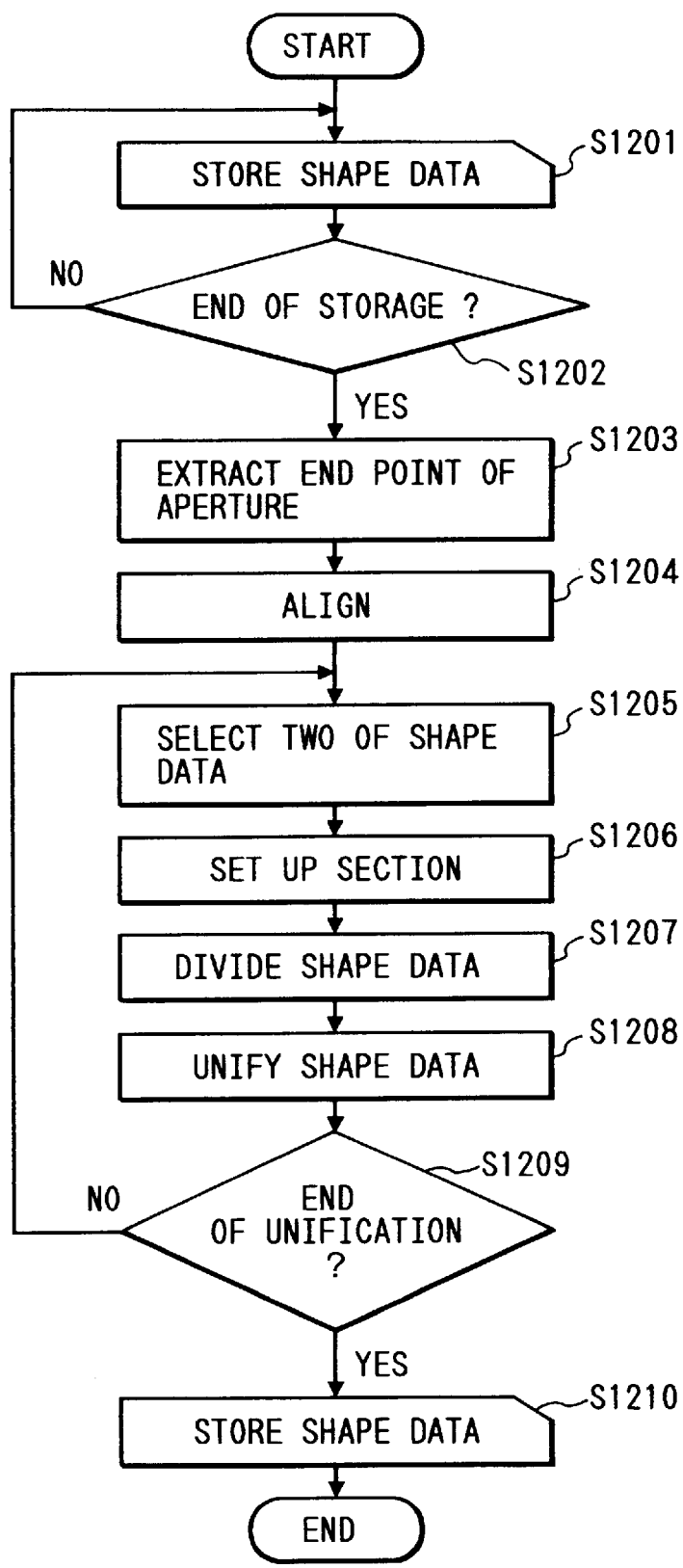
FIG. 29 is a flow chart of a three-dimensional shape data unifying process in a 10th embodiment.

FIG. 29 is a flow chart of the three-dimensional shape data unifying process of the 10th embodiment, wherein steps S1201, S1202, S1203, S1204, S1205, S1206, S1207, S1209, and S1210 are respectively same, in FIG. 25 as the steps S801, S802, S803, S804, S805, S806, S807, S812 and S813.

In comparison with the 8th embodiment, the 10th embodiment lacks the step S809 for determining whether the unification can be executed by verifying the position of the section plane, and allows, in the shape unification in the step S1208, to use a part of the vertexes of the aperture as the vertexes of the triangular patches. In the following there will be explained the shape unification process of the 10th embodiment, with reference to a flow chart in FIG. 30.

Figure 30:
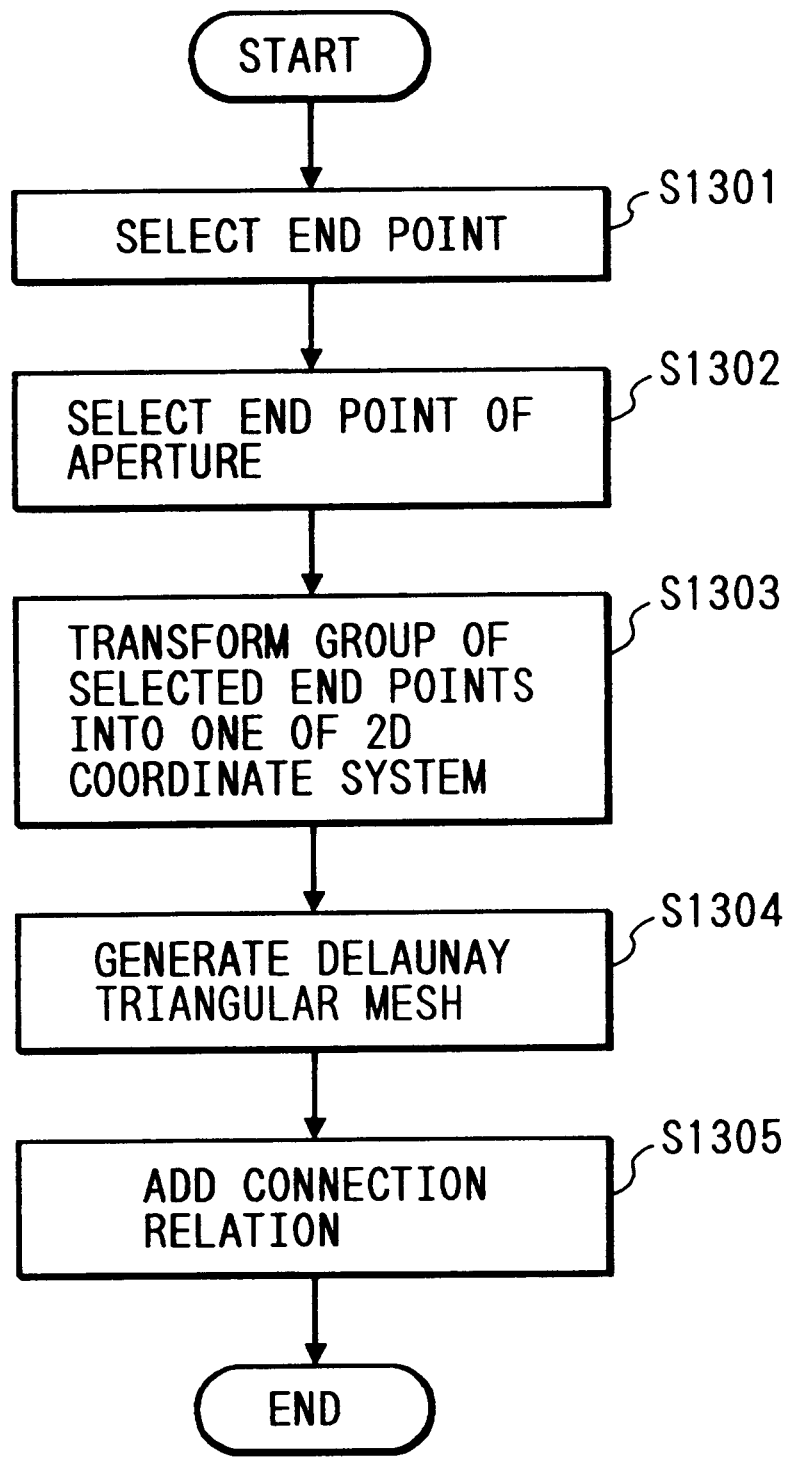
FIG. 30 is a flow chart of a shape unifying process in the 10th embodiment.

In FIG. 30, steps S1301, S1304 and S1305 are same as the steps S21, S23 and S24 in FIG. 14. A step S1302 selects, among the end points of the aperture selected in the step S803 (FIG. 25), an end point contained in a partial set (A or B) containing the polygon data to be left after the unification, according to the selection of the operator in the step S16 (FIG. 13). In a process starting from a step S1303, the vertexes of the shape data, selected in the steps S1301 and S1302, are used for connecting the shape data.

Figure 31:
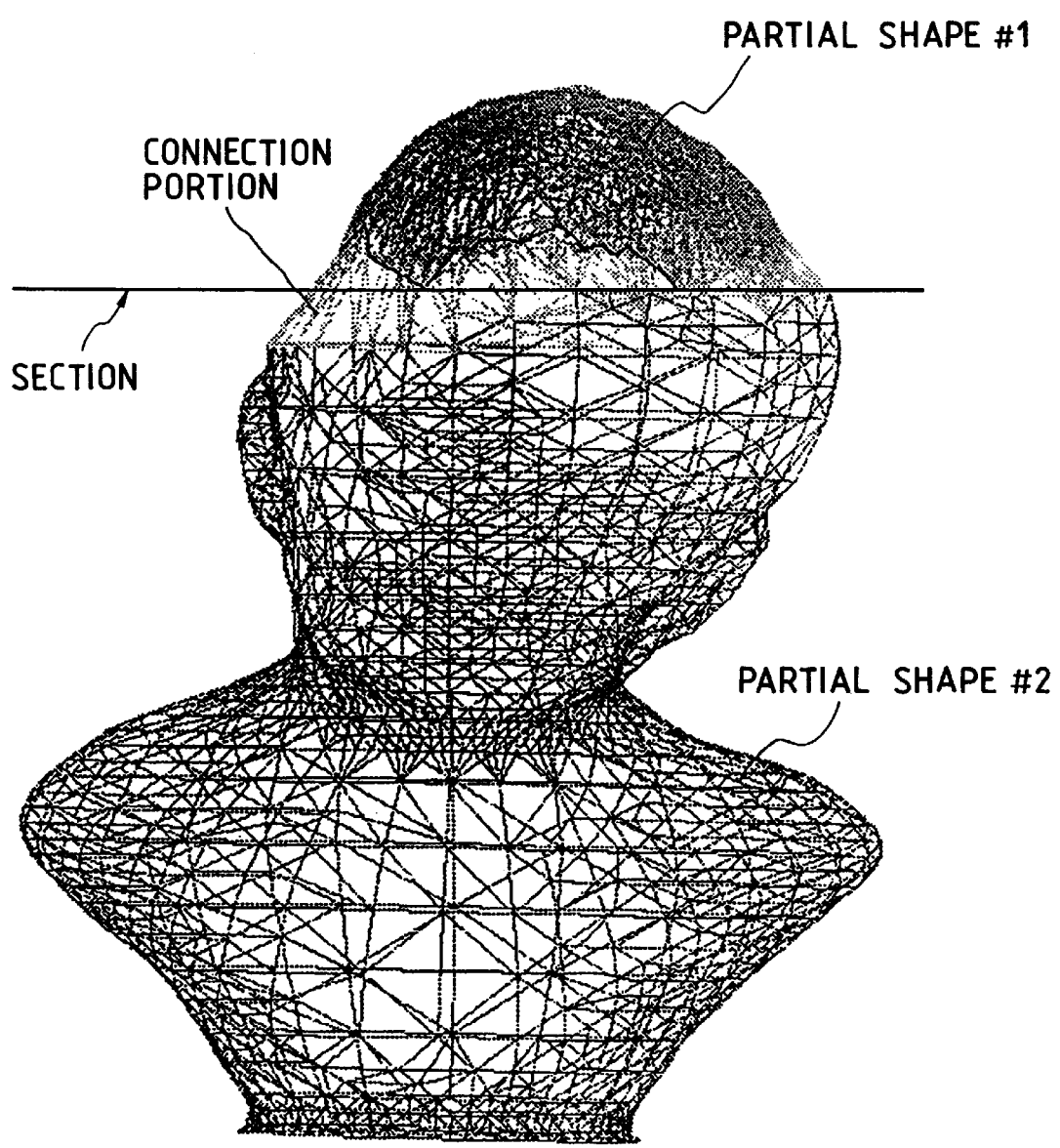
FIG. 31 is a view showing an example of shape data connection by the method of the 10th embodiment.

FIG. 31 shows an example of connection of the shape data according to the method of the present embodiment. FIG. 31 illustrates the unification of partial shapes #1 and #2. A right-hand portion of the aperture of the partial shape #1 and an aperture of the partial shape #2 are eliminated by the shape dividing process.

As explained in the foregoing, the 8th and 9th embodiments allow the operator to know whether the selection plane, set for unifying plural shape data, is appropriately positioned. Also, even when the section plane is positioned inappropriately, it is still possible to generate geometrical data of the object without void portion, by unifying polygon patch data, independently generated from distanced image data entered from plural directions.

Also in the 10th embodiment explained in the foregoing, even in case the section plane does not at all cross either of the two shape data, the operator can know whether the position of the section plane is appropriate, or the unification of the shape data can be achieved, without any change in the above-explained process. Stated differently, even when the section plane is set in an area where the two three-dimensional shapes do not overlap, the operator can know whether the position of the section plane is appropriate by the algorithm of the 8th to 10th embodiments. However, although the unification of the shape data is possible even in such case, the section plane is preferably set in an area where the two three-dimensional shapes mutually overlap in consideration of the accuracy of the shape data obtained by the unification (level of faithful reproduction of the object shape).

The objects of the present invention, attained by the apparatus or the methods explained in the foregoing, are also attainable by a memory medium (such as a floppy disk, a CD-ROM, a magnetooptical disk etc.) storing a program of the foregoing embodiments. In such case the novel function of the present invention can be achieved by mounting such memory medium in an apparatus and by reading the program from the memory medium. The configuration and the procedure for causing the control program, provided by such memory medium, to be executed by the CPU 23 will not be explained as they are obvious to those skilled in the art. In the following there will be explained the structural feature of the program of the present invention.

Figure 32B:
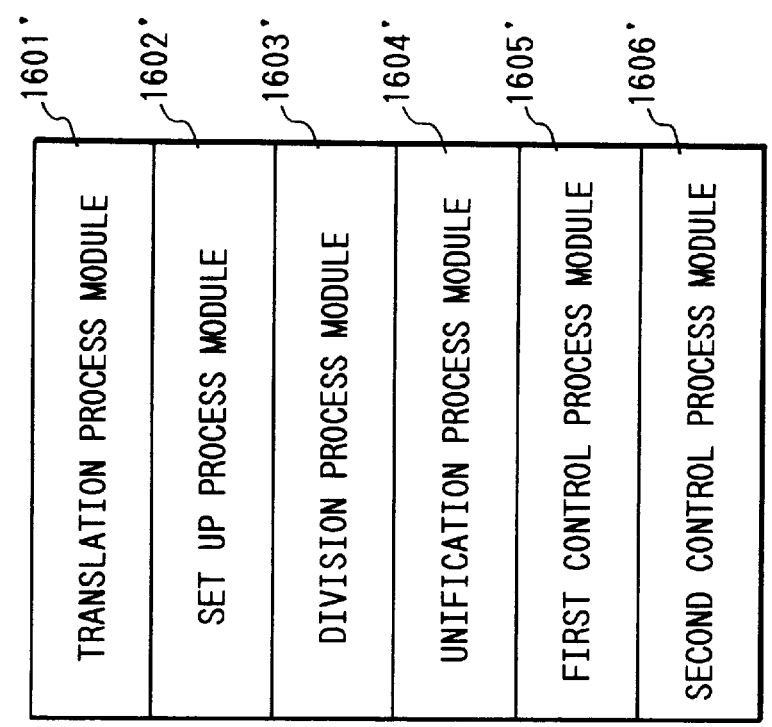
FIGS. 32A and 32B are views showing the structural feature of a program of the present invention.
Figure 32A:
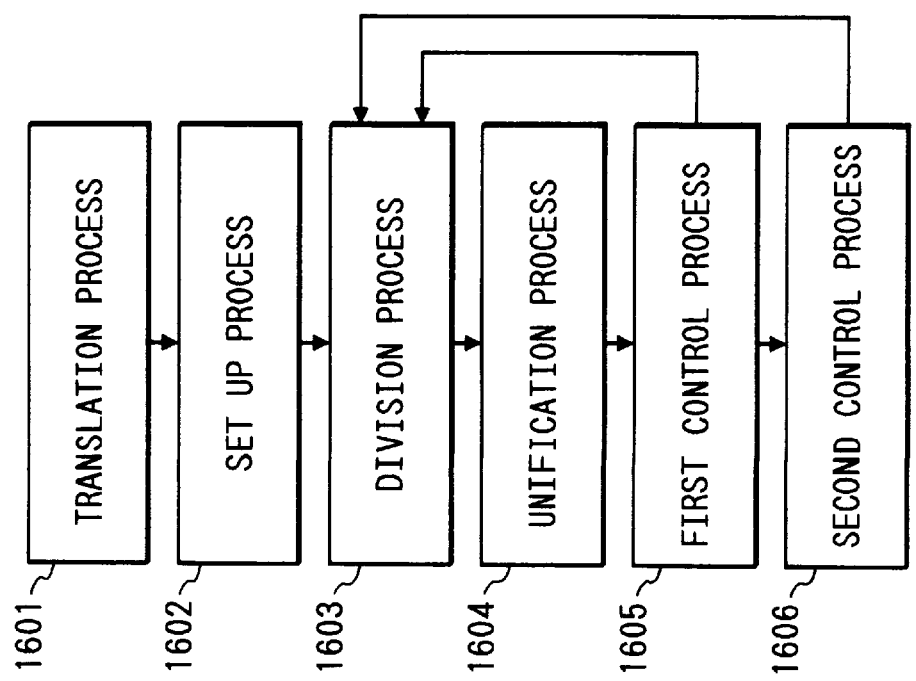

FIGS. 32A and 32B show the structural feature of the program of the present invention. FIG. 32A shows the process sequence of the program. 1601 is a translation process for moving the shape data of a predetermined hierarchic level of the plural hierarchic three-dimensional shape data to a positional relationship for unification, and corresponds to the step S304 in FIG. 19. 1602 is a setting process for selecting two shape data from the shape data after translation in the process 1601 and setting a section plane as the boundary for the unification of the both shape data, and corresponds to the step S306 in FIG. 19.

1603 is a division process for dividing each of the two shape data to be unified, by means of the section plane, and forming a gap area on both sides of the section plane, between thus divided partial data, and corresponds to the step S308 in FIG. 19. 1604 is a unification process for unifying two shape data by generating triangular patches in the gap area, and corresponds to the step S309 in FIG. 19.

1605 is a 1st control process for effecting the unification of the shape data by the unification process 1604 on all the plural hierarchic three-dimensional shape data to be unified, and corresponds to the step S310 in FIG. 19. 1606 is a 2nd control process for effecting the unification by the 1st control process 1605 on all the hierarchic levels of the above-mentioned plural hierarchic three-dimensional shape data, utilizing the result of translation by the process 1601 and the section plane set by the setting process 1602, and corresponds to the step S311 in FIG. 19. As explained in the 2nd embodiment, the setting process 1602 may be executed for each hierarchic level.

FIG. 32B shows a memory map of the memory medium storing the program of the present invention. A translation process module 1601', a setting process module 1602', a division process module 1603', a unification process module 1604', a 1st control module 1605', and a 2nd control module 1606' are program modules for respectively executing the translation process 1601, setting process 1602, division process 1603, unification process 1604, 1st control process 1605 and 2nd control process 1606.

FIGS. 33A and 33B show the structural feature of another program of the present invention. FIG. 33A shows the process sequence of the program. A translation process 1701, a setting process 1702 and a division process 1703 are respectively similar to the above-explained translation process 1601, setting process 1602 and division process 1603, and respectively correspond to the steps S804, S806 and S807 in FIG. 25.

A discrimination process 1704 discriminates whether the section plane crosses the aperture of at least either of the two shape data to be unified, and corresponds to the step S808 in FIG. 25. 1705 is a unification process for unifying the two shape data by generating triangular patches in the gap area in case the section plane is identified as not crossing the aperture of the two shape data to be unified, and corresponds to the steps S809, S810 in FIG. 25.

FIG. 33B shows a memory map of the memory medium storing the program of the present invention, wherein a translation process module 1701', a setting process module 1702', a division process module 1703', a discrimination process module 1704', and a unification process module 1705' are program modules for respectively executing the translation process 1701, setting process 1702, division process 1703, discrimination process 1704 and unification process 1705.

Figure 34B:
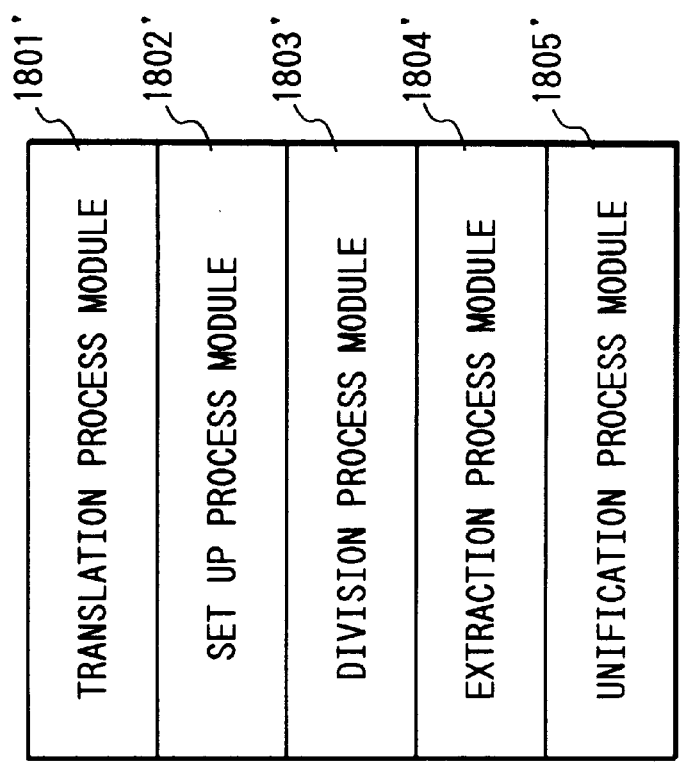
FIGS. 34A and 34B are views showing the structural feature of still another program of the present invention.
Figure 34A:
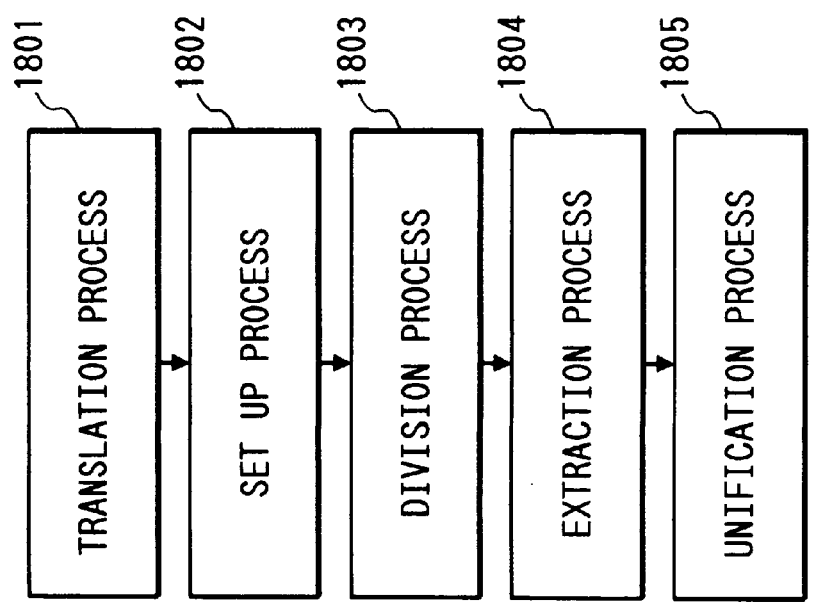

FIGS. 34A and 34B show the structural feature of still another program of the present invention. FIG. 34A shows the process sequence of the program. A translation process 1801, a setting process 1802 and a division process 1803 are respectively similar to the translation process 1601, the setting process 1602 and the division process 1603 explained above, and respectively corresponds to the steps S1204, S1206 and S1207 in FIG. 29.

1804 is an extraction process for extracting the vertexes constituting the gap area between the partial shapes to be used for unification and the vertexes contained in the partial shapes among those of the aperture within the shape data to be unified, and corresponds to the steps S1301 and S1302 in FIG. 30. 1805 is a unification process for unifying the two shape data by generation of the triangular patches in the gap area, utilizing the vertexes extracted in the extraction process 1804, and corresponds to the steps S1303–S1305 in FIG. 30.

FIG. 34B shows a memory map of the memory medium storing the program of the present invention. A translation process module 1801', a setting process module 1802', a division process module 1803', an extraction process module 1804' and a unification process module 1805' are program modules for respectively executing the translation process 1801, setting process 1802, division process 1803, extraction process 1804 and unification process 1805.

The present invention is applicable not only to a system consisting of plural equipment but also to an apparatus consisting solely of an equipment. It is naturally applicable also to a case where the present invention is attained by the supply of a program to a system or an apparatus. In such case the memory medium storing the program of the present invention constitutes the present invention, and the reading of such program from such memory medium into the system or the apparatus causes such system or apparatus to function in the predetermined manner.

As explained in the foregoing, the 6th to 10th embodiments allow to unify the plural hierarchic shape data having plural polygon patches different in the precision of shape expression, thereby enabling to improve the function of the shape model utilizable in CAD or virtual reality.

Also the 6th to 10th embodiments allow, in the unification of the shape data, to automatically judge whether a void portion is created by the apertures, depending on the various settings at the unification process.

Furthermore, the 6th to 10th embodiments allow to achieve unification so as to prevent the formation of a void portion, even in case the unification of the shape data is influenced by the presence of the aperture.

What is claimed is:

1. A method for unifying three-dimensional shape data comprising:
    a storage step of storing plural three-dimensional shape data representing an object;
    an alignment step of effecting mutual alignment of said plural three-dimensional shape data;
    a section plane setting step of setting, for the plural three-dimensional shape data subjected to said alignment, a section plane in the vicinity of the boundary of said plural three-dimensional shape data;
    a shape dividing step of determining partial shape data separated by said section plane; and
    a generation step of representing, for each section plane, the data of regions of said partial shape data on both sides of said section plane by a two-dimensional coordinate system, and generating triangular patch data with Delaunay triangular mesh in said regions.

2. A method for unifying three-dimensional shape data comprising:
    a storage step of storing plural three-dimensional shape data representing an object;
    a setting step of setting, for every two of said plural three-dimensional shape data, a section plane in the vicinity of the boundary of said three-dimensional shape data;
    a shape dividing step of determining partial shape data separated by said section plane; and
    a generation step of representing, for each section plane, the data of regions of said partial shape data on both sides of said section plane by a two-dimensional coordinate system, and generating triangular patch data with Delaunay triangular mesh in said regions.

3. A method for unifying three-dimensional shape data according to claim 1 further comprising a unification step of unifying the plural three-dimensional shape data with the addition of said triangular patch data.

4. A method for unifying three-dimensional shape data according to claim 1, wherein said three-dimensional shape data is data represented by triangular patches.

5. A method for unifying three-dimensional shape data according to claim 4, wherein said three-dimensional shape data includes vertex coordinates of each triangle and information on the mutual connection of the vertexes.

6. A method for unifying three-dimensional shape data according to claim 1, wherein said generation step is adapted to convert, among first partial shape data, the data of points adjacent to the section plane into the coordinate system of second partial shape data, and to project thus converted data, together with data of points adjacent to the section plane among second partial shape data onto an arbitrary two-dimensional coordinate system.

7. A method for unifying three-dimensional shape data according to claim 1, wherein said generation step is adapted to generate a Delaunay triangular mesh, utilizing the data represented by said two-dimensional coordinate system, to select the connection relationship of said Delaunay triangular mesh same as that of the original data mutually facing across the section plane, and to generate polygon patches in regions across said section plane where the polygon patches are absent.

8. A method for unifying three-dimensional shape data according to claim 1, wherein said alignment step is adapted, in case the plural three-dimensional shape data stored in said storage step are constructed on respectively independent coordinate systems, to match the positional relationship among said coordinate systems, thereby effecting alignment in such a manner that all said plural three-dimensional shape data are represented in a unified coordinate system.

9. A method for unifying three-dimensional shape data according to claim 8, wherein said alignment step is adapted, to display said plural three-dimensional shape data, and the alignment is executed, based on an operation of the operator.

10. A method for unifying three-dimensional shape data according to claim 1, wherein said shape dividing step is adapted to select, among the partial shape data separated by said section plane, partial shape data to be left as the shape data after unification.

11. A method for unifying three-dimensional shape data according to claim 3, wherein said unification step is adapted to project a set of points selected from said first and second polygon patch data onto the coordinate system of the original image from which the first polygon patch data is generated, thereby unifying said plural three-dimensional shape data.

12. A method for unifying three-dimensional shape data according to claim 3, wherein said generation step is adapted to select, among the sides of said Delaunay triangular mesh, those connecting the vertexes of the polygon patch data above said section plane and the vertexes of the polygon patch data below said section plane, and to add the connection relationship based on thus selected sides.

13. A method for unifying three-dimensional shape data according to claim 3, further comprising a selection step of selecting two from the plural three-dimensional shape data subjected to the alignment in said alignment step, wherein said section plane setting step is adapted to set the section plane in the vicinity of the boundary of the two three-dimensional shape data selected in said selection step.

14. A method for unifying three-dimensional shape data according to claim 1, further comprising a selection step of selecting two from the plural three-dimensional shape data stored in said storage step, wherein said alignment step is adapted to effect the mutual alignment of the two three-dimensional shape data selected in said selection step.

15. An apparatus for unifying three-dimensional shape data comprising:
    storage means for storing plural three-dimensional shape data representing an object;
    alignment means for effecting mutual alignment of said plural three-dimensional shape data;
    section plane setting means for setting, for the plural three-dimensional shape data subjected to said alignment, a section plane in the vicinity of the boundary of said plural three-dimensional shape data;

shape dividing means for determining partial shape data separated by said section plane; and unification means for representing, for each section plane, the data of regions of said partial shape data on both sides of said section plane by a two-dimensional coordinate system, and generating triangular patch data with Delaunay triangular mesh in said regions.

16. An apparatus for unifying three-dimensional shape data comprising:

storage means for storing plural three-dimensional shape data representing an object;

setting means for setting, for every two of said plural three-dimensional shape data, a section plane in the vicinity of the boundary of said three-dimensional shape data;

shape dividing means for determining partial shape data separated by said section plane; and unification means for representing, for each section plane, the data of regions of said partial shape data on both sides of said section plane by a two-dimensional coordinate system, and generating triangular patch data with Delaunay triangular mesh in said regions.

17. An apparatus for unifying three-dimensional shape data according to claim 15, wherein said three-dimensional shape data is data represented by triangular patches.

18. An apparatus for unifying three-dimensional shape data according to claim 17, wherein said three-dimensional shape data includes vertex coordinates of each triangle and information on the mutual connection of the vertexes.

19. An apparatus for unifying three-dimensional shape data according to claim 15, wherein said unification means is adapted to convert, among first partial shape data, the data of points adjacent to the section plane into the coordinate system of second partial shape data, and to project thus converted data, together with data of points adjacent to the section plane among second partial shape data onto an arbitrary two-dimensional coordinate system.

20. An apparatus for unifying three-dimensional shape data according to claim 15, wherein said unification means is adapted to generate a Delaunay triangular mesh, utilizing the data represented by said two-dimensional coordinate system, to select the connection relationship of said Delaunay triangular mesh same as that of the original data mutually facing across the section plane, and to generate polygon patches in regions across said section plane where the polygon patches are absent, thereby unifying said plural three-dimensional shape data.

21. An apparatus for unifying three-dimensional shape data according to claim 15, wherein said alignment means is adapted, in case the plural three-dimensional shape data stored in said storage means are constructed on respectively independent coordinate systems, to match the positional relationship among said coordinate systems, thereby effecting alignment in such a manner that all said plural three-dimensional shape data are represented in a unified coordinate system.

22. An apparatus for unifying three-dimensional shape data according to claim 21, wherein said alignment means is adapted to display said plural three-dimensional shape data, and the alignment is executed, based on an operation of the operator.

23. An apparatus for unifying three-dimensional shape data according to claim 15, wherein said shape dividing means is adapted to select, among the partial shape data separated by said section plane, partial shape data to be left as the shape data after unification.

24. An apparatus for unifying three-dimensional shape data according to claim 15, wherein said unification means is adapted to project a set of points selected from said first and second polygon patch data onto the coordinate system of the original image from which the first polygon patch data is generated, thereby unifying said plural three-dimensional shape data.

25. An apparatus for unifying three-dimensional shape data according to claim 15, wherein said unification means is adapted to select, among the sides of said Delaunay triangular mesh, those connecting the vertexes of the polygon patch data above said section plane and the vertexes of the polygon patch data below said section plane, and to add the connection relationship based on thus selected sides.

26. An apparatus for unifying three-dimensional shape data according to claim 15, further comprising selection means for selecting two from the plural three-dimensional shape data subjected to the alignment in said alignment means, wherein said section plane setting means is adapted to set the section plane in the vicinity of the boundary of the two three-dimensional shape data selected by said selection means.

27. An apparatus for unifying three-dimensional shape data according to claim 15, further comprising selection means for selecting two from the plural three-dimensional shape data stored in said storage means, wherein said alignment means ia adapted to effect the mutual alignment of the two three-dimensional shape data selected by said selection means.

* * * * *

UNITED STATES PATENT AND TRADEMARK OFFICE
CERTIFICATE OF CORRECTION

PATENT NO. : 5,969,725

DATED : October 19, 1999

INVENTOR(S) :

MASAKAZU FUJIKI ET AL.

It is certified that error appears in the above-identified patent and that said Letters Patent is hereby corrected as shown below:

COLUMN 15:

Line 27, "a re" should read --are--.

COLUMN 17:

Line 2, "a" should be deleted.

COLUMN 24:

Line 40, "claim 3," should read --claim 1,--; and
Line 47, "claim 3," should read --claim 1,--.

Signed and Sealed this

Eighth Day of May, 2001

*Attest:*

NICHOLAS P. GODICI

*Attesting Officer*   Acting Director of the United States Patent and Trademark Office